United States Patent [19]

Smith

[11] Patent Number: 4,730,261

[45] Date of Patent: Mar. 8, 1988

[54] SOLIDS MODELLING GENERATOR

[75] Inventor: David M. Smith, Saratoga, Calif.

[73] Assignee: Ramtek Corporation, Santa Clara, Calif.

[21] Appl. No.: 35,630

[22] Filed: Apr. 6, 1987

Related U.S. Application Data

[63] Continuation-in-part of Ser. No. 545,366, Oct. 23, 1983, Pat. No. 4,667,306, which is a continuation-in-part of Ser. No. 515,946, Jul. 20, 1983, abandoned.

[51] Int. Cl.$^4$ .............................................. G06F 3/14
[52] U.S. Cl. ................................. 364/521; 364/900; 364/512; 364/518; 364/522; 340/729
[58] Field of Search ............... 364/512, 518, 521, 522, 364/900 MS; 340/724, 726, 747, 752, 729

[56] References Cited

U.S. PATENT DOCUMENTS

| | | | |
|---|---|---|---|
| 4,475,104 | 10/1984 | Shen | 340/729 |
| 4,529,978 | 7/1985 | Rupp | 340/727 |
| 4,549,275 | 10/1985 | Sukonick | 364/521 |
| 4,580,236 | 4/1986 | Tsujioka et al. | 364/719 |
| 4,594,673 | 6/1986 | Holly | 364/522 |
| 4,648,049 | 3/1987 | Dines et al. | 364/521 |
| 4,677,573 | 6/1987 | Brown et al. | 364/521 |

*Primary Examiner*—Gary V. Harkcom
*Assistant Examiner*—Randy W. Lacasse
*Attorney, Agent, or Firm*—Limbach, Limbach & Sutton

[57] ABSTRACT

Surface fill using Bresenhem algorithm concepts can be adapted to handle the hidden surface and shading functions required in solids modelling. A first plurality of vector generators provides the surface fill function, a second plurality of vector generators provides the hidden surface function, and a third plurality of vector generators provides the shading function. All three pluralities of vector generators can be run in unison to increase the speed at which images of solids can be generated by a factor of 1000.

8 Claims, 21 Drawing Figures

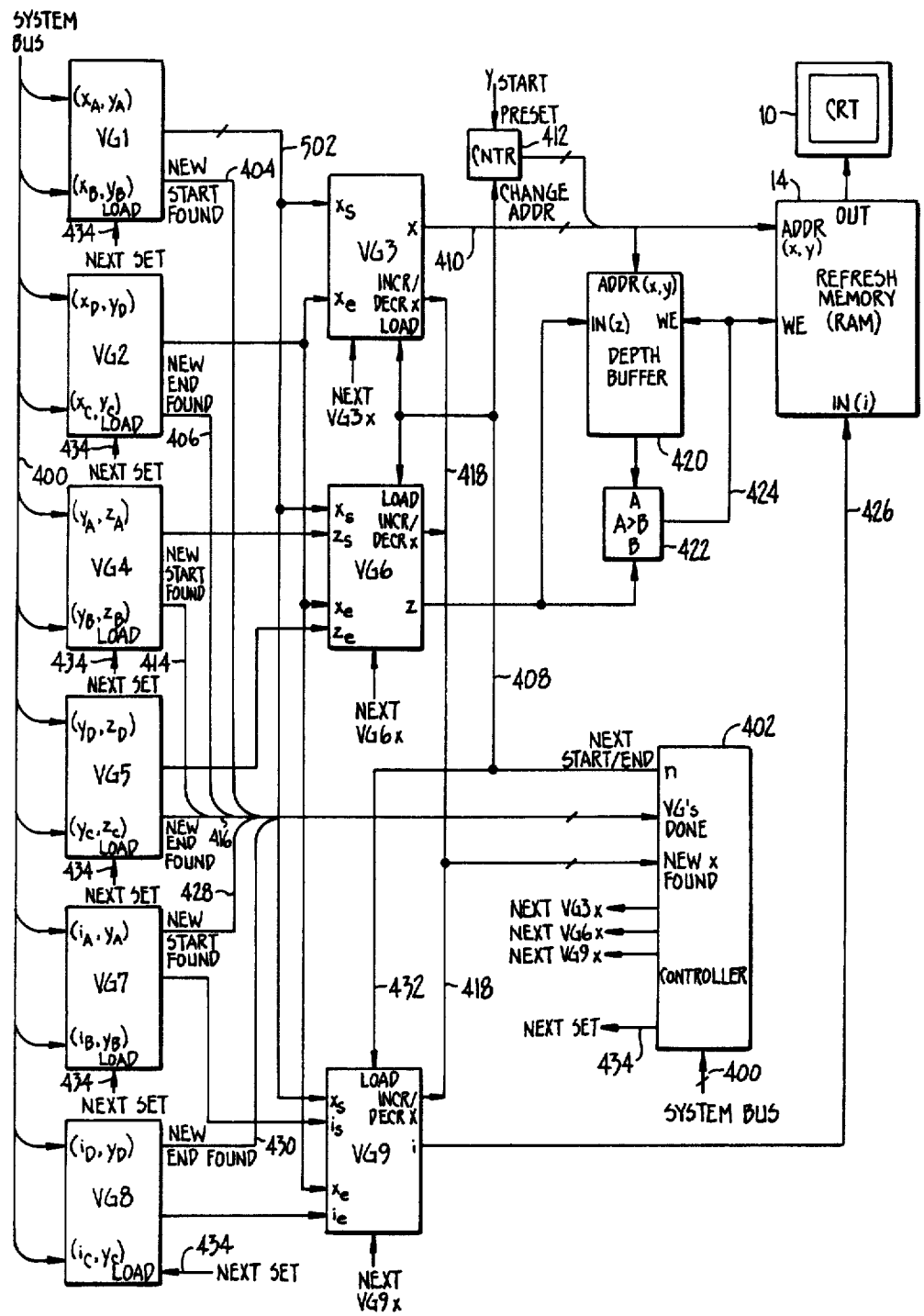
FIG._1.

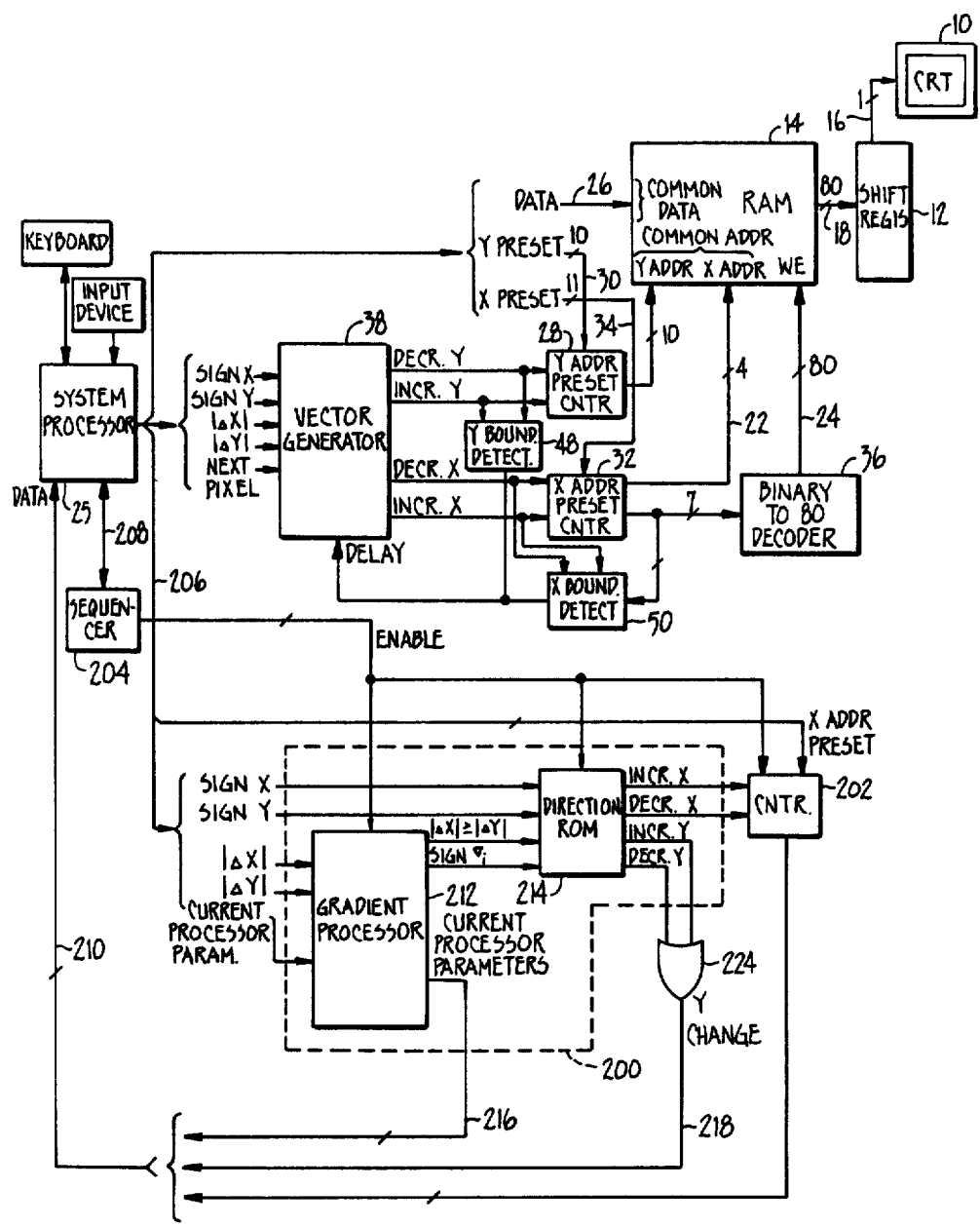
FIG._2.

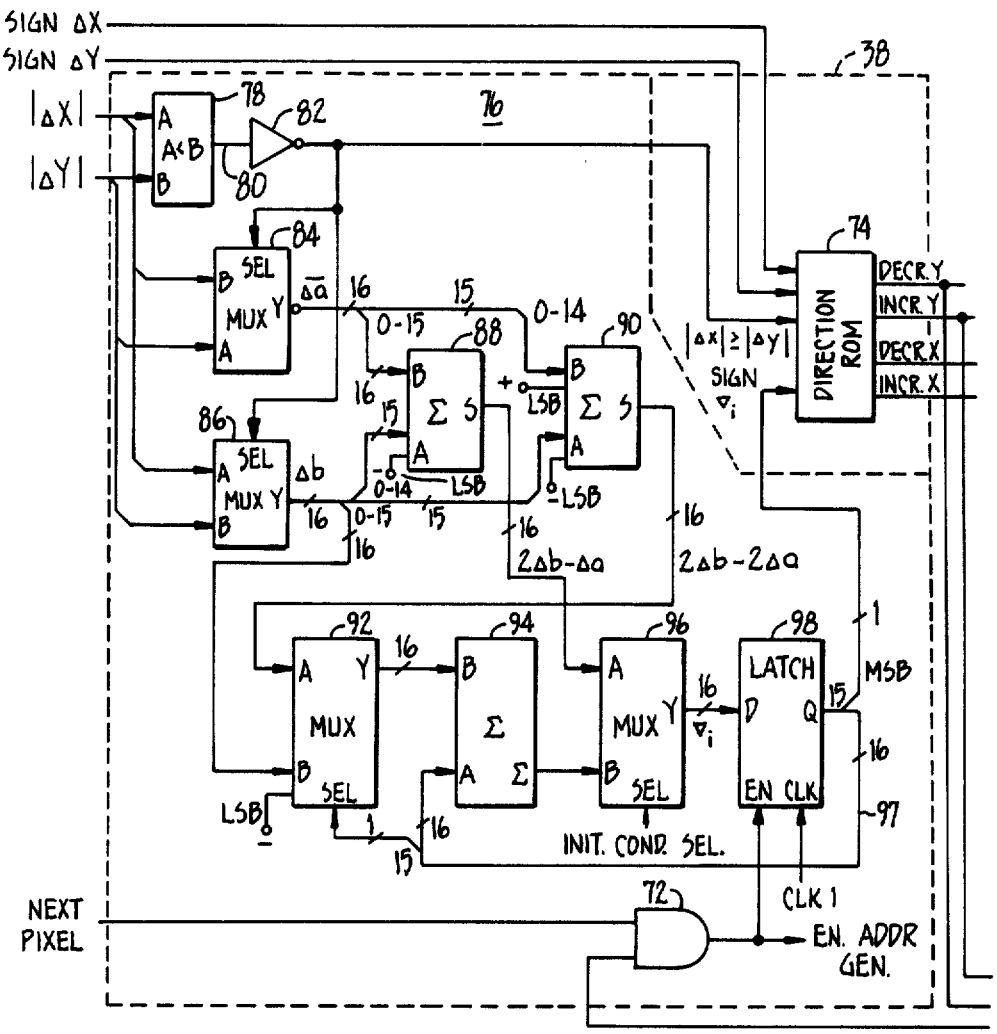
FIG._3.

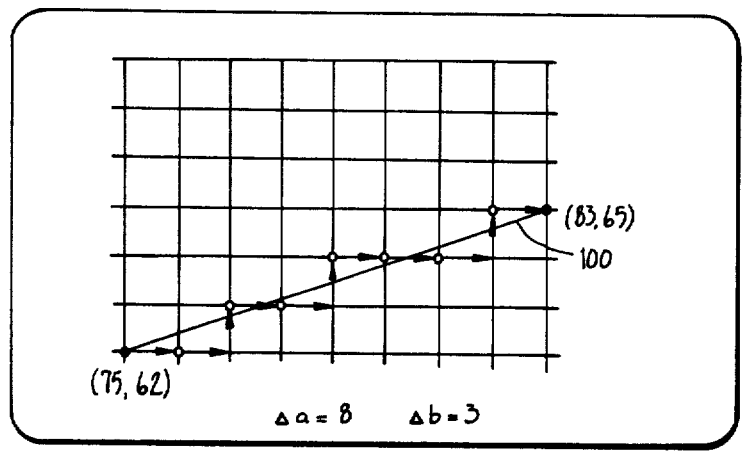
| ITERATION | $\nabla_i$ | Y: SCAN LINE ADDR | BLOCK X: ADDR | SITE ADDR WITHIN BLOCK | BOUNDARY DETECT | |
|---|---|---|---|---|---|---|
| | | BIT: 9 8 7 6 5 4 3 2 1 0 | 10 9 8 7 | 6 5 4 3 2 1 0 | X | Y |
| | | 0 0 0 0 1 1 1 1 0 0 | 0 0 0 | 1 1 1 0 1 0 1 | 0 | 0 |
| 1 | -2 | 0 0 0 0 1 1 1 1 0 0 | 0 0 0 | 1 1 1 0 1 1 0 | 0 | 0 |
| 2 | +4 | 0 0 0 0 1 1 1 1 1 0 | 0 0 0 | 1 1 1 0 1 1 1 | 0 | 1 |
| 3 | -6 | 0 0 0 0 1 1 1 1 1 0 | 0 0 0 | 1 1 1 1 0 0 0 | 0 | 0 |
| 4 | 0 | 0 0 0 1 0 0 0 0 0 0 | 0 0 0 | 1 1 1 1 0 0 1 | 0 | 1 |
| 5 | -10 | 0 0 0 1 0 0 0 0 0 0 | 0 0 0 | 1 0 0 0 0 0 0 | 1 | 0 |
| 6 | -4 | 0 0 0 1 0 0 0 0 0 0 | 0 0 0 | 1 0 0 0 0 0 1 | 0 | 0 |
| 7 | +2 | 0 0 0 1 0 0 0 0 0 1 | 0 0 0 | 1 0 0 0 0 1 0 | 0 | 1 |
| 8 | -8 | 0 0 0 1 0 0 0 0 0 1 | 0 0 0 | 1 0 0 0 0 1 1 | 0 | 0 |
FIG._4.

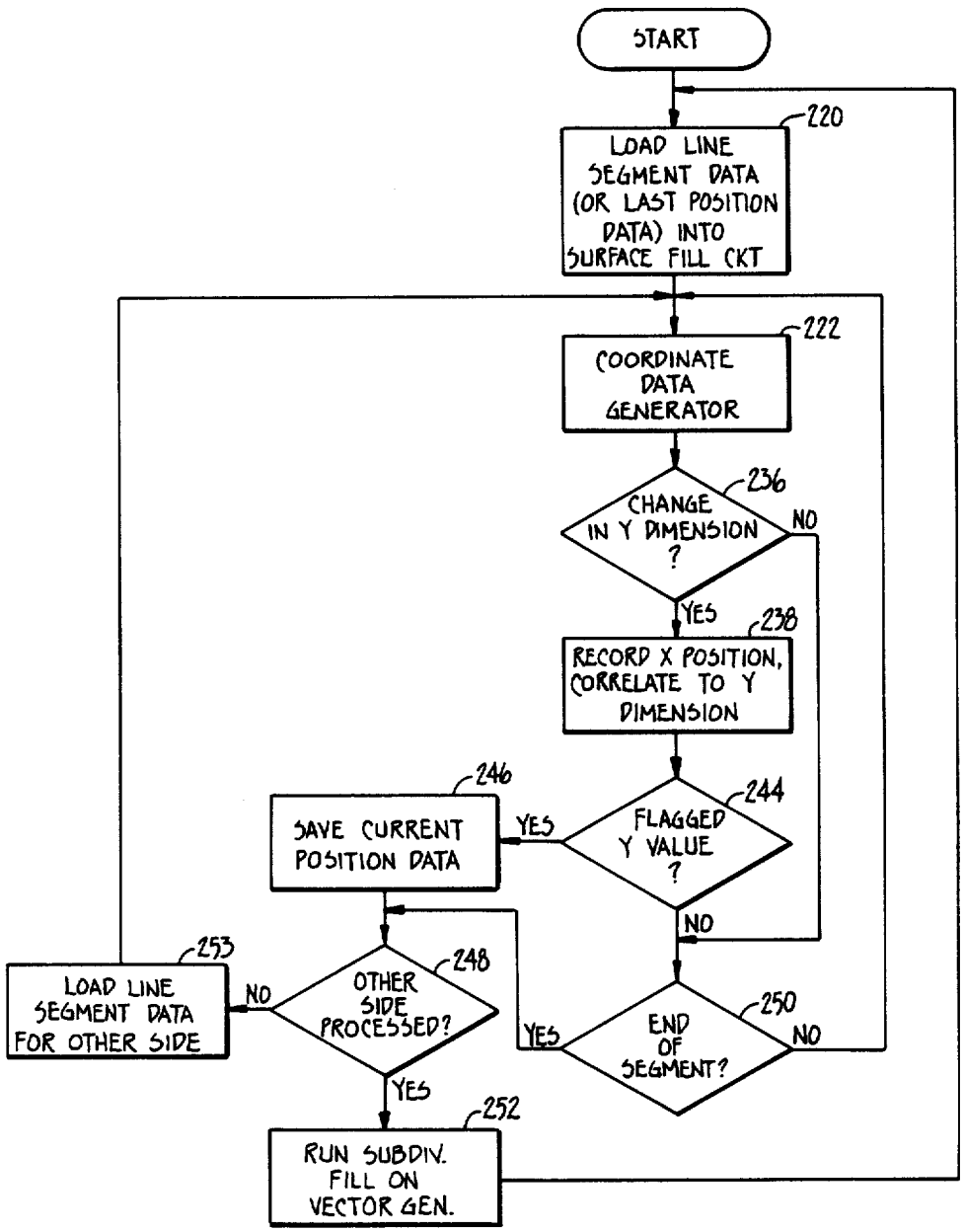
FIG._5.

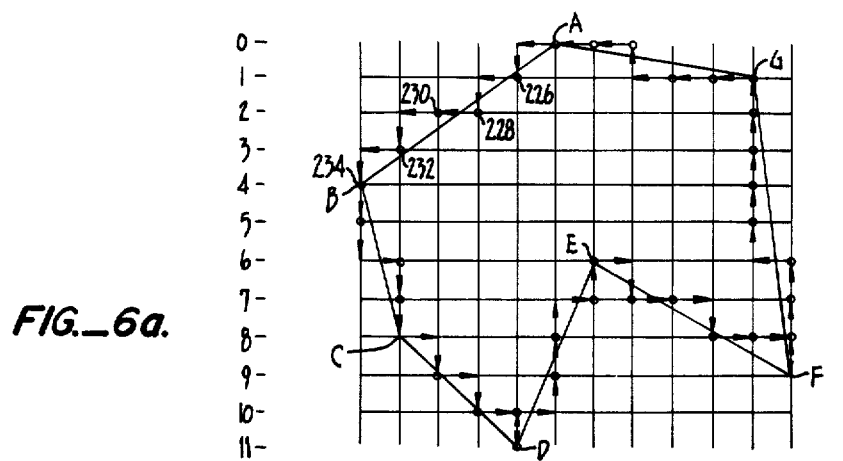
FIG._6a.
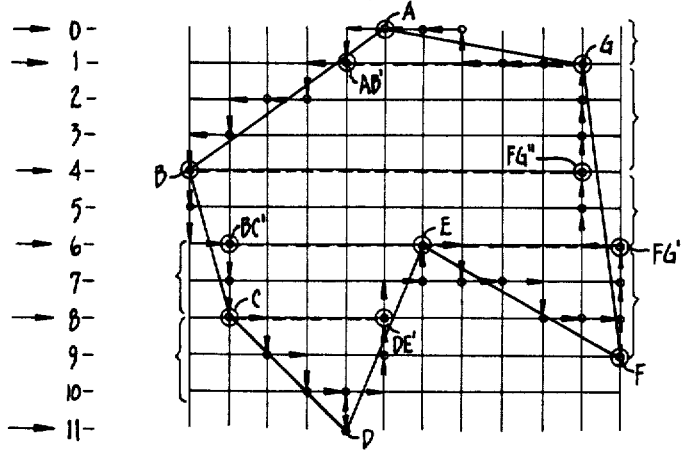
FIG._6b.
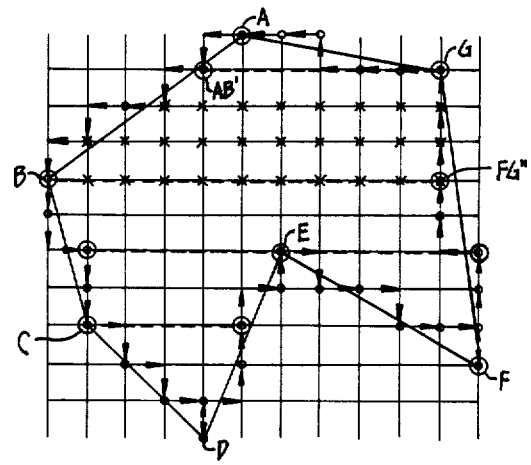
FIG._6c.

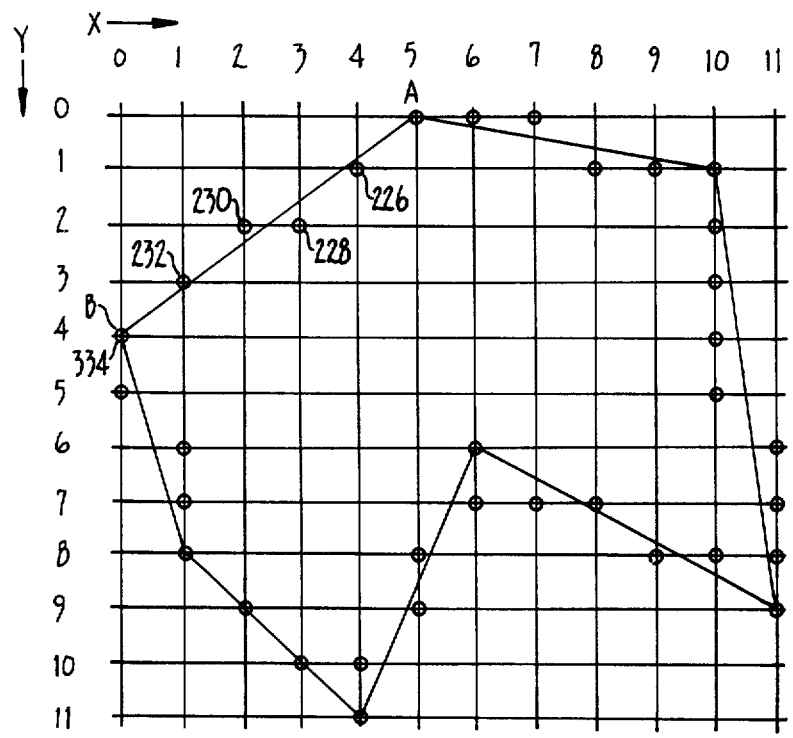
FIG._7a.
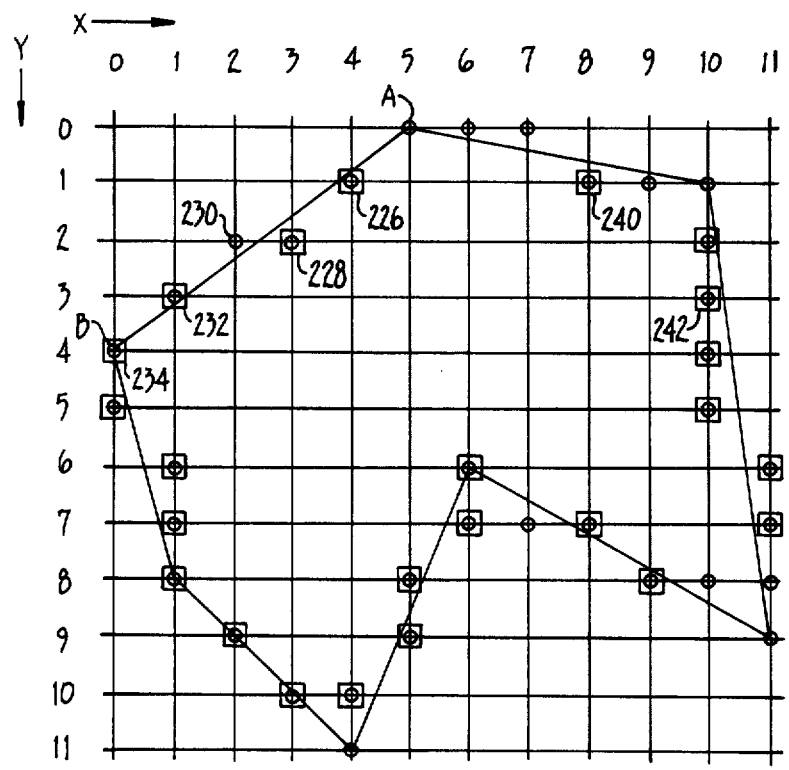
FIG._7b.

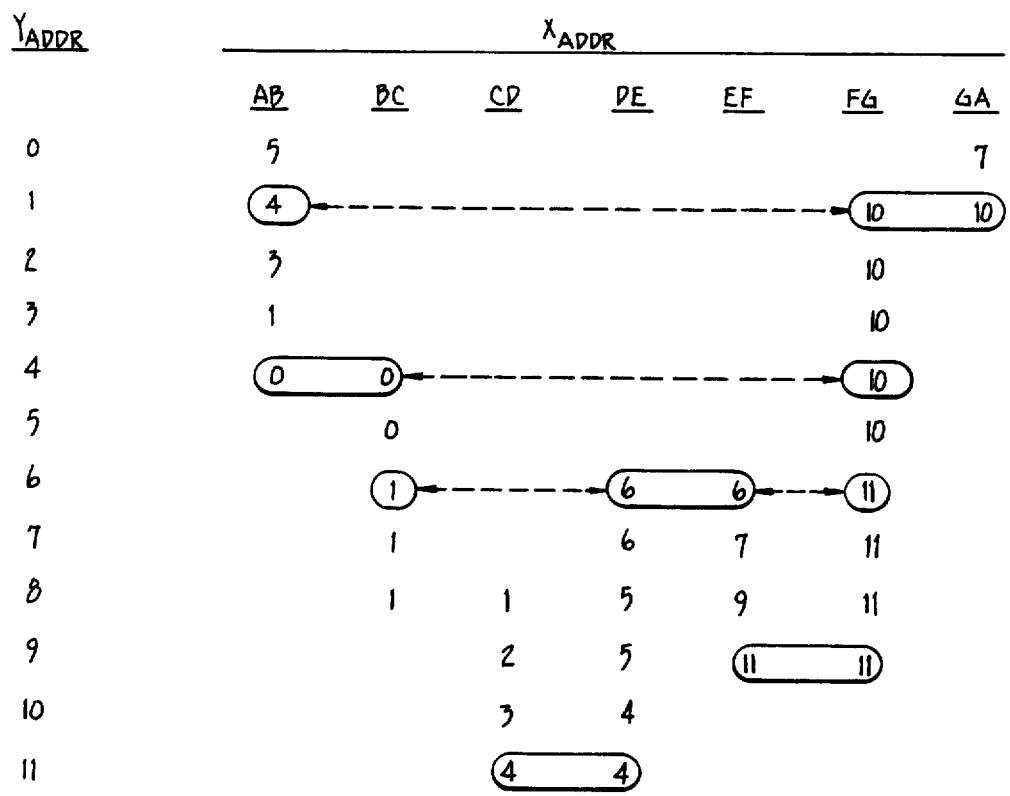
FIG._7c.

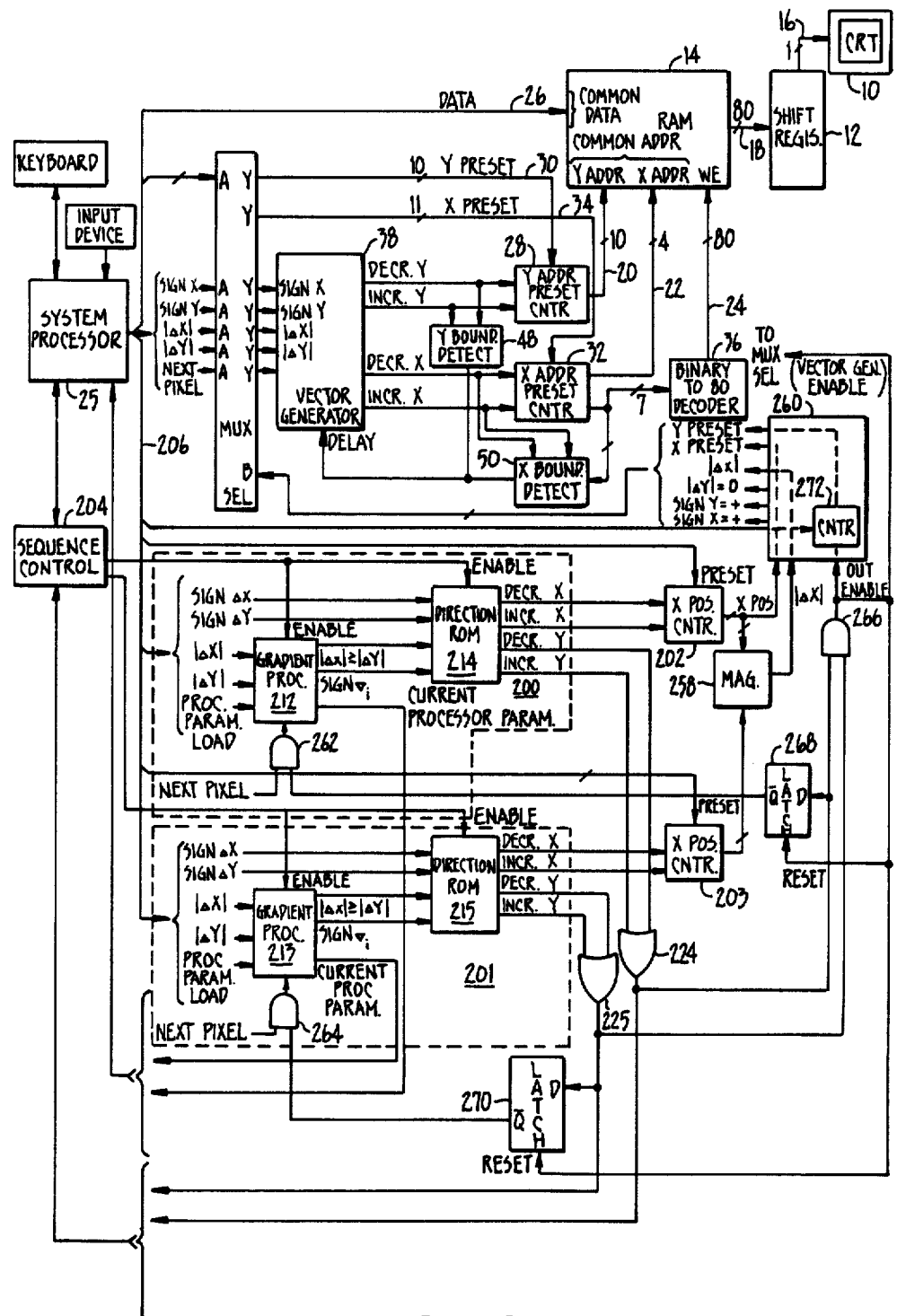
FIG._8a.

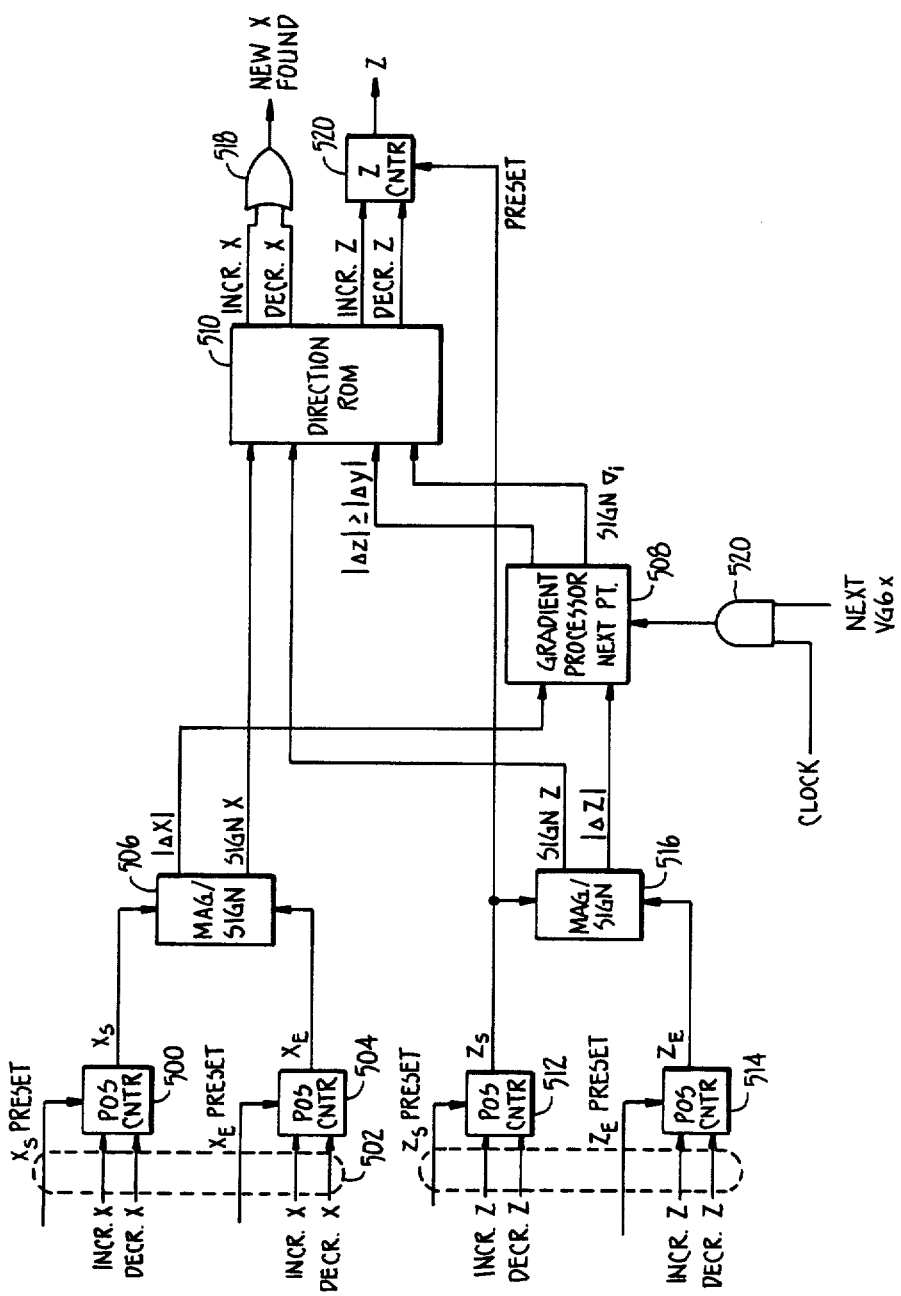
FIG._8b.

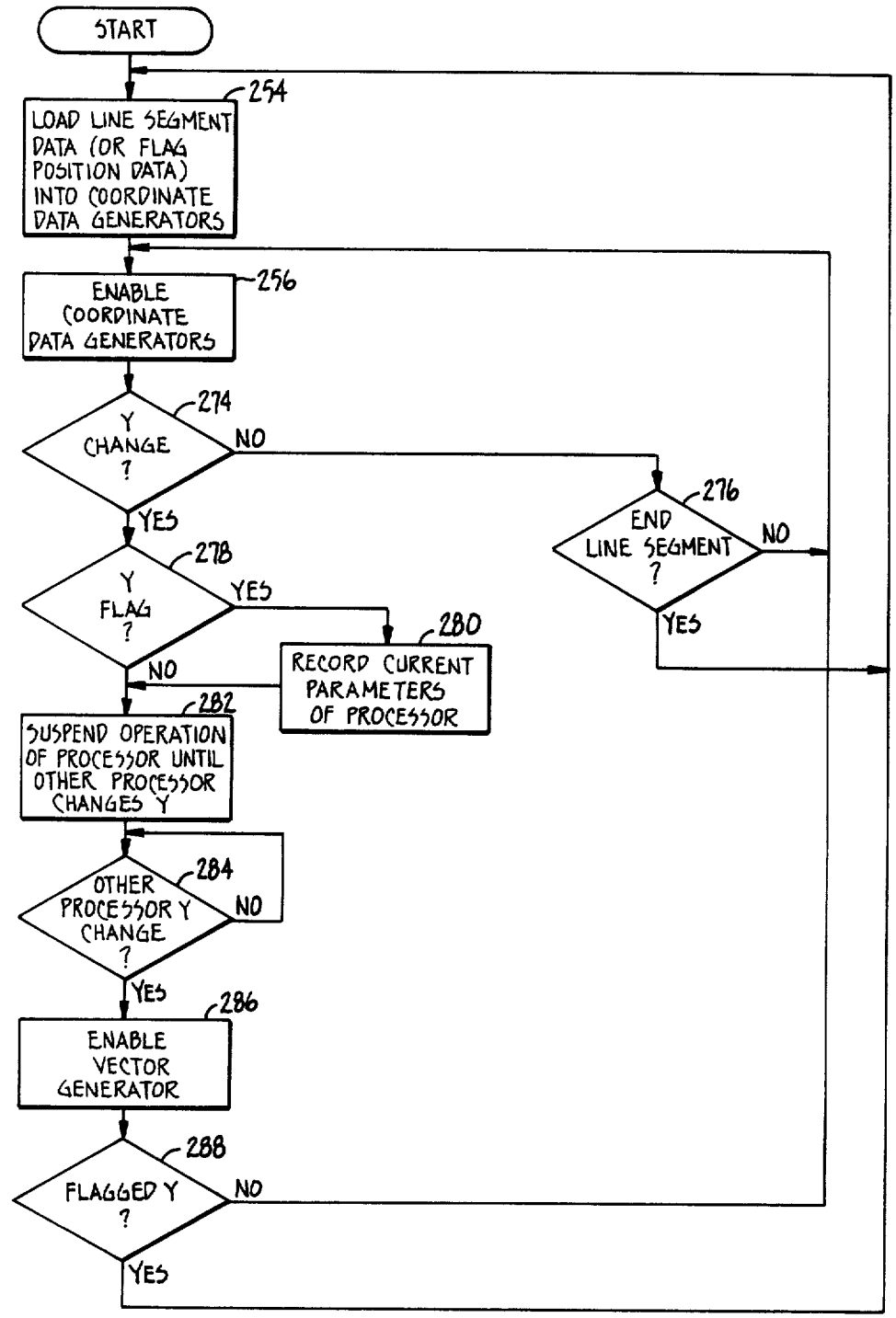
FIG._9.

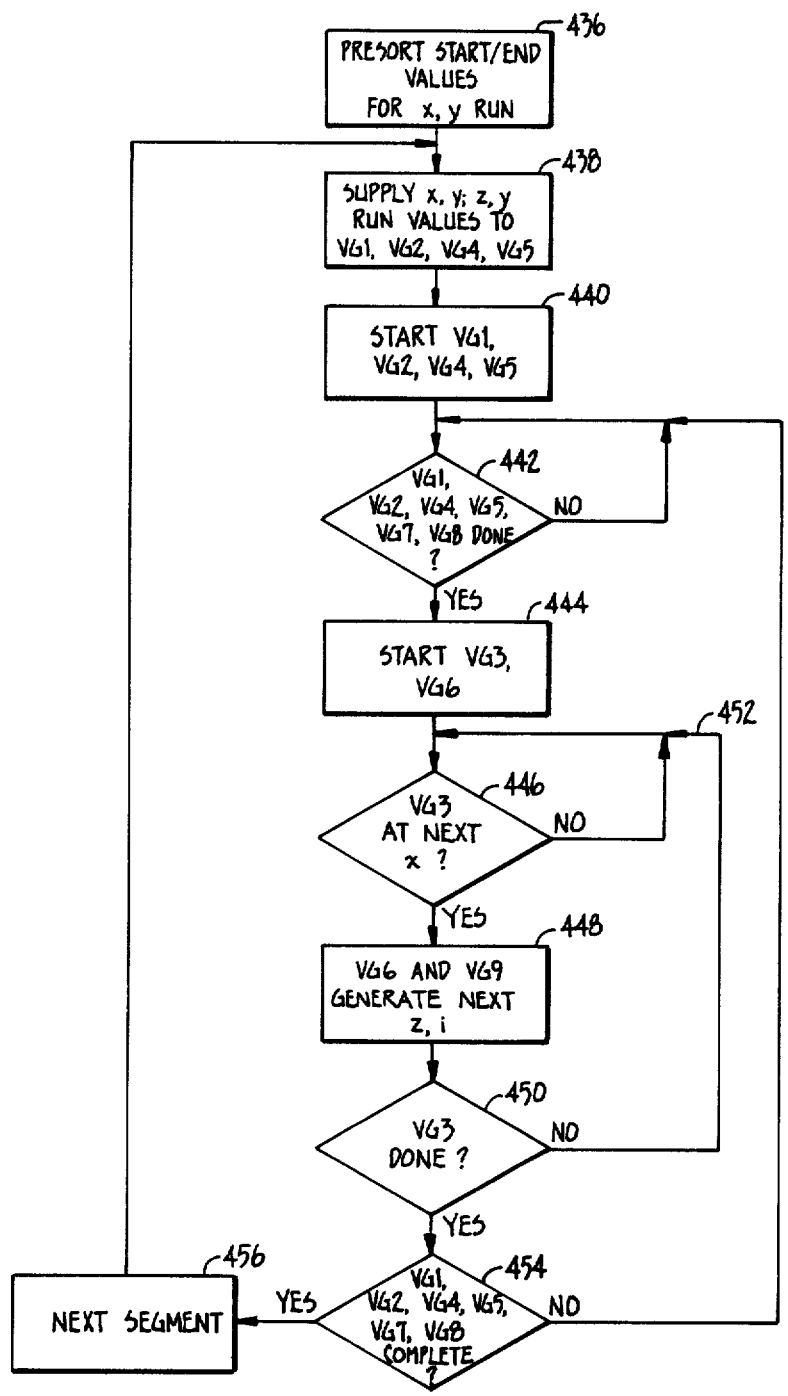
FIG._10.

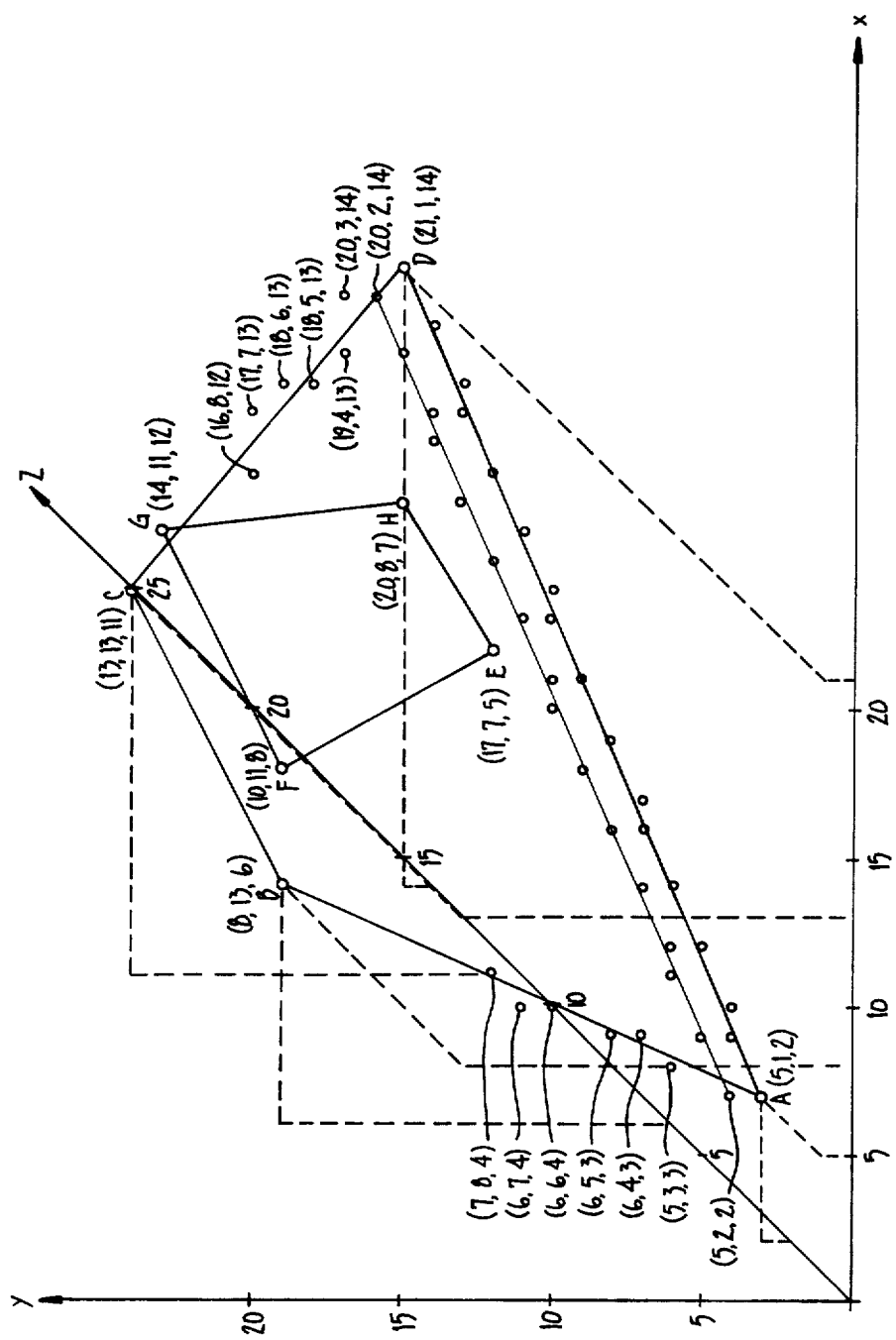
FIG.—11a.

| A TO B, $\Delta a = 12$, OCTANT 1 $\Delta b = 3$ | | | | D TO C, $\Delta a = 12$, OCTANT 2 $\Delta b = 8$ | | | | | |
|---|---|---|---|---|---|---|---|---|---|
| i | $\nabla_{i+1}$ | incr X? | incr Y? | | $\nabla_{i+1}$ | incr X? | incr Y? | $X_s$ | $X_e$ | Y |
| 0 | 6 - 12 = -6 | — | +1 | | 16 - 12 = 4 | -1 | +1 | 5 | 20 | 2 |
| 1 | -6 + 6 = 0 | — | +1 | | 4 + 16 - 24 = -4 | — | +1 | 5 | 20 | 3 |
| 2 | 0 + 6 = 6 | +1 | +1 | | -4 + 16 + 12 | -1 | +1 | 6 | 19 | 4 |
| 3 | 6 + 6 - 24 = -12 | — | +1 | | 12 + 16 - 24 = 4 | -1 | +1 | 6 | 18 | 5 |
| 4 | -12 + 6 = -6 | — | +1 | | 4 + 16 - 24 = -4 | — | +1 | 6 | 18 | 6 |

FIG.—11b-1.

| A TO B, $\Delta a=12$, OCTANT 0 | $\Delta b=4$ | | 0 TO C, $\Delta a=12$, OCTANT 7 | $\Delta b=3$ | | | | |
|---|---|---|---|---|---|---|---|---|
| i | $\nabla_{i+1}$ | incr Y? | incr Z? | $\nabla_{i+1}$ | incr Y? | incr Z? | $Z_s$ | $Z_e$ | Y |
| 0 | 8 − 12 = −4 | +1 | — | 6 − 12 = −6 | +1 | — | 2 | 14 | 2 |
| 1 | −4 + 8 = 4 | +1 | +1 | −6 + 6 = 0 | +1 | — | 3 | 14 | 3 |
| 2 | 4 + 8 − 24 = −12 | +1 | — | 0 + 6 = 6 | +1 | −1 | 3 | 13 | 4 |
| 3 | −12 + 8 = −4 | +1 | +1 | 6 + 6 − 24 = −12 | +1 | — | 3 | 13 | 5 |
| 4 | −4 + 8 = +4 | +1 | — | −12 + 6 = −6 | +1 | — | 4 | 13 | 6 |
| 5 | −12 | +1 | +1 | −6 + 6 = 0 | +1 | −1 | 4 | 13 | 7 |
| 6 | −4 | +1 | — | 6 | +1 | — | 4 | 12 | 8 |
| 7 | 4 | +1 | +1 | −12 | +1 | — | 5 | 12 | 9 |
| 8 | −12 | +1 | — | −6 | +1 | — | 5 | 12 | 10 |
| 9 | −4 | +1 | +1 | 0 | +1 | −1 | 5 | 12 | 11 |
| 10 | 4 | +1 | — | 6 | +1 | — | 6 | 11 | 12 |

FIG._11b-2.

| i | (5,1,2) → (21, 1, 14)  $\Delta a = 16, \Delta b = 12$  OCTANT 0  $\nabla_{i+1}$ | incr X? | incr Z? | (5,3,3) → (20, 3, 14)  $\Delta a = 15, \Delta b = 11$  OCTANT 0  $\nabla_{i+1}$ | incr X? | incr Z? | $X_s$ | $X_e$ | Y |
|---|---|---|---|---|---|---|---|---|---|
| 0 | 24 − 16 = 8 | +1 | +1 | 22 − 15 = 7 | +1 | +1 | | | |
| 1 | 8 + 24 − 32 = 0 | +1 | — | 7 + 22 − 30 = −1 | +1 | — | | | |
| 2 | 0 + 24 = 24 | +1 | +1 | −1 + 22 = 21 | +1 | +1 | | | |
| 3 | 24 + 24 − 32 = 16 | +1 | +1 | 21 + 22 − 30 = 13 | +1 | +1 | | | |
| 4 | 16 + 24 − 32 = 8 | +1 | +1 | 13 + 22 − 30 = 5 | +1 | +1 | | | |
| 5 | 0 | +1 | — | 5 + 22 − 30 = −3 | +1 | — | | | |
| 6 | 24 | +1 | +1 | −3 + 22 = 19 | +1 | +1 | | | |
| 7 | 16 | +1 | +1 | 19 + 22 − 30 = 11 | +1 | +1 | | | |
| 8 | 8 | +1 | +1 | 11 + 22 − 30 = 3 | +1 | +1 | | | |
| 9 | 0 | +1 | — | 3 + 22 − 30 = −5 | +1 | — | | | |
| 10 | 24 | +1 | +1 | −5 + 22 = 17 | +1 | +1 | | | |
| 11 | 16 | +1 | +1 | 17 + 22 − 30 = 9 | +1 | +1 | | | |
| 12 | 8 | +1 | +1 | 9 + 22 − 30 = 9 | +1 | +1 | | | |
| 13 | 0 | +1 | — | 1 + 22 − 30 = −7 | +1 | — | | | |
| 14 | 24 | +1 | +1 | −7 + 22 = 14 | +1 | +1 | | | |
| 15 | 16 | +1 | +1 | 14 + 22 − 30 = 6 | +1 | +1 | | | |

FIG._11b-3.

(5,2,2) TO (20,2,14)  Δa = 12, Δb = 3
OCTANT 0
| i | $\nabla_{i+1}$ | incr X? | incr Z? |
|---|---|---|---|
| 0 | 24 − 15 = 9 | +1 | +1 |
| 1 | 9 + 24 − 30 = 3 | +1 | +1 |
| 2 | 3 + 24 − 30 = −3 | +1 | — |
| 3 | −3 + 24 = 21 | +1 | +1 |
| 4 | 21 + 24 − 30 = 15 | +1 | +1 |
| 5 | 15 + 24 − 30 = 9 | +1 | +1 |
| 6 | 3 | +1 | +1 |
| 7 | −3 | +1 | — |
| 8 | 21 | +1 | +1 |
| 9 | 15 | +1 | +1 |
| 10 | 9 | +1 | +1 |
| 11 | 3 | +1 | +1 |
| 12 | −3 | +1 | — |
| 13 | 21 | +1 | +1 |
| 14 | 15 | +1 | +1 |
470
FIG._11b-4.
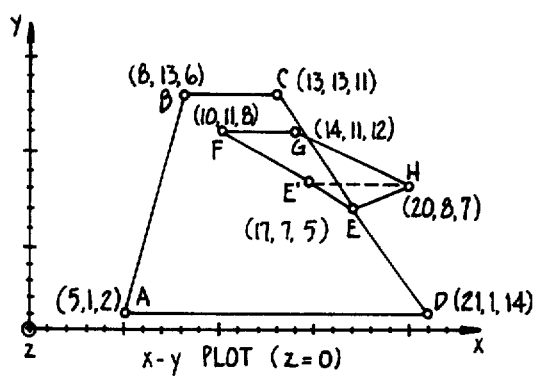
x-y PLOT (z=0)
FIG._11c.

400;
SOLIDS MODELLING GENERATOR

DESCRIPTION

This is a continuation-in-part of copending U.S. patent application Ser. No. 545,366, filed Oct. 25, 1983 now U.S. Pat. No. 4,667,306, which is a continuation-in-part of U.S. patent application Ser. No. 515,946, filed July 20, 1983, now abandoned.

TECHNICAL FIELD

The present invention is, in general, directed to solids modelling, and more particularly, to a method and apparatus for performing hidden surface removal, and shading in the high speed display of solids in a computer graphics display system.

BACKGROUND ART

In computer graphics systems, an image is produced on a visual display screen. The information by which this visual image is generated is stored in a screen refresh random access memory on a one-to-one or one-pixel-to-one-storage site basis. That is, for each pixel of the visual image display, there is a corresponding storage site in the random access memory (RAM) which contains data corresponding to and describing the visual information of that pixel. In order to display the information from the screen refresh RAM, the data from the screen refresh RAM are periodically read out on a line-by-line basis and displayed on a line-by-line basis in the visual display. Typical of these displays are raster scanning devices such as high density television monitors which have a large number of horizontally displayed scan lines.

In order to write information into the screen refresh RAM, an X and a Y address are supplied to the RAM, along with the data to be written thereby. A write enable signal is supplied to the RAM to write the data into the addressed storage site. This process is repeated for each storage site into which data are to be written by supplying a different address for each different storage site being whiten into.

Solids modelling is a task which has traditionally represented heavy computational and RAM access loads. Although a solid can be defined by way of line segments, which in turn define surfaces, the very definition of a solid dictates that certain surfaces of the solid, or portions thereof, will be obscured from view, depending upon the viewing position of the viewer. Thus, as a part of the displaying of solids, these hidden surfaces, or partial surfaces, must be identified and suppressed. The hidden surface problem is one that has been studied widely and is viewed as requiring a significant amount of processing time to implement.

Because solids are non planar, different portions of the solid can reflect light differently than other portions. Thus, shading of the solid is sometimes required to represent these different light intensities due to such curvature. In practice, this shading is performed by defining intensities at selected points for each surface and interpolating intensities for other points on the surface from these defined intensities. Thus, it can be seen that the shading problem can require a significant amount of processing time.

DISCLOSURE OF THE INVENTION

The foregoing problems of previous apparatus for solids modelling are overcome by the present invention.

The invention described in the above referenced parent application provides a surface-fill capability through a modified use of coordinate data generating means, such as a vector generator.

It has been discovered that these concepts can be adapted to handle the hidden surface and shading functions required in solids modelling.

In accordance with the present invention, a first plurality of vector generators provides the surface fill function, a second plurality of vector generators provides the hidden surface function, and a third plurality of vector generators provides the shading function. All three pluralities of vector generators can be run in unison to increase the speed at which images of solids can be generated by a factor of 1000.

In the invention of the above referenced application, coordinate data generating means are provided which are responsive to line segment data. The line segment data specify line segments that bound the surface to be filled. The coordinate data generating means are of the type which provide increment/decrement instructions by which points, collectively forming the particular line segment, can be located on the visual display. The location of each point is designated by an address including coordinate values that represent physical positions along the different dimensions of the visual display; e.g. "x" and "y" axis coordinates. Means are provided which respond to the increment/decrement instructions by generating a first dimension address coordinate for each such point. Means also are provided which monitor the increment/decrement instructions for instructions indicating address coordinate changes along a second dimension of the visual display.

When either a decrement or increment instruction is received, which indicates an address coordinate change along the second dimension, the monitor means correlate the current first dimension address coordinate to the changed second dimension address coordinate. This information is then placed in a table which includes the locations of every point of the line segment being evaluated which has a different second dimension location or coordinate in relation to the other points. When all of the line segments which bound the surface have been evaluated in the above manner, the table being maintained by the monitor means contains end points for a plurality of parallel lines. These parallel lines, when written into the visual display, will collectively fill the surface.

In one embodiment of the invention described in the above referenced application, the end points of all of the line segments which bound the surface are evaluated and utilized to generate a set of flags correlated to the second dimension coordinate of each of the end points. These flags are then used to control the operation of the coordinate data generating means so that the surface is effectively divided into a number of subdivisions, with each subdivision being separately filled-in, in sequence. Thus, when the coordinate data generating means has completed evaluation of the line segments which bound one of the subdivisions, an instruction can be provided to the system to proceed with writing in the parallel line segments defined in the surface fill table. Thereafter, the coordinate data generating means can proceed with evaluating the next subdivision and forming the surface fill table therefor.

In another embodiment of the invention described in the above referenced application, a plurality of coordinate data generating means are provided so that several of the line segments bounding a particular subdivision can be evaluated simultaneously to generate the corresponding surface fill table more quickly. Although this latter alternative embodiment involves more hardware, the improvement in speed of a surface fill operation can be substantial.

In one embodiment of the present invention, the plurality of vector generators which performs the surface fill function generates addresses of the points on the surfaces of the solids being modelled. Because of the bit-mapped nature of the refresh memory and visual display, these addresses also correspond to locations in refresh memory. These locations store intensity values for each of the visible points of the surface of the solid. Because of the hidden surfaces problem, the intensity values for the surface currently being operated upon will not necessarily be the values stored in refresh memory.

The second plurality of vector generators operates concurrently with the first plurality to determine the depth of the points of the surface currently being operated upon relative to a fixed reference, such as the plane of the screen of the visual display. Thus, for example in an x,y,z coordinate system, as the first plurality of vector generators determines the x,y positions of the points of the current surface, the second plurality of vector generators determine, in association with those x,y values, the z values for those points. The z values, as they are generated, are compared against z values stored in a depth buffer at the same x,y locations. The stored z values correspond to other previously-operated-upon surfaces of the solid. If the stored z value is greater than the current z value, indicating that the current point of the current surface is in front of the previous surface, it is replaced with the current z value.

Concurrently with the operation of the first and second pluralities of vector generators, a third plurality of vector generators operates upon the intensity values to determine shading intensities for each of the points being identified. If the second plurality of vector generators identifies the current point as being in front of the corresponding point of the previously operated-upon surface, the current intensity for the current point will be stored in the refresh memory at the current x,y position.

A controller monitors the progress of each vector generator of the first, second and third pluralities of vector generators and issues appropriate control signals to maintain then in proper synchronization.

In the preferred embodiment of the present invention the vector generators can be Bresenhem vector generators.

In the above manner, images of solids can be generated and displayed at speeds up to one thousand times faster than previously possible.

It is therefore an object of the present invention to provide a solids modelling apparatus having speeds several orders of magnitude faster than previously possible.

It is another object of the present invention to provide a solids modelling apparatus employing several pluralities of vector generators operating concurrently to define surface fill and hidden surface points and intensity values corresponding to those defined points.

It is a further object of the present invention to provide a solids modelling apparatus which employs concurrently operating Bresenhem vector generators.

These and other objectives, features and advantages of the present invention will be more readily understood upon consideration of the following detailed description of the present invention, taken in conjunction with the accompanying drawings.

DESCRIPTION OF THE DRAWINGS

FIG. 1 is a simplified block diagram of the present invention.

FIG. 2 is a functional block diagram which illustrates the surface fill elements employed in the present invention and their relationship to the vector generation portion of a computer graphics system FIG. 3 is a more detailed functional block diagram of an implementation of the Bresenhem vector generation algorithm employed in the present invention.

FIG. 4 is an example of the operation of the surface-fill apparatus employed in the present invention.

FIG. 5 is a simplified flow diagram of the operation of the surface fill function employed in the present invention.

FIGS. 6a through 6c illustrate the steps involved in the evaluation of line segments and the formation of a surface fill table.

FIGS. 7a and 7b are a further illustration of the formation of the surface fill table.

FIG. 7c shows the surface fill table for the subdivision.

FIG. 8a is a functional block diagram of an alternate embodiment of surface fill circuitry employed in the present invention.

FIG. 8b is a functional block diagram of the vector generator structure for VG6 and VG9 of FIG. 1.

FIG. 9 is a simplified flow diagram of the operation of the alternative embodiment of FIG. 8a.

FIG. 10 is a simplified logic flow diagram of the present invention.

FIG. 11a is a simplified example of the operation of the present invention.

FIG. 11b-1 to 11b-4 is a table of excerpted coordinate determination corresponding to the simplified example of FIG. 11a.

FIG. 11c is a plot of the surface of the example of FIG. 11a in the x-y plane.

DETAILED DESCRIPTION OF THE INVENTION

As was described in the above referenced patent applications, and as will be described in more detail in this specification, a surface defined in a two dimensional space can be filled by first breaking the surface into subdivisions such as triangles and trapezoids, where the triangles have at least one side, and the trapezoids have at least two parallel sides, parallel to a specified coordinate axis.

For the triangles, the end points of the line segments which bridge the parallel side are provided to concurrently running vector generators. These concurrently running vector generators, in turn, define points along the line segments. These points, in turn, are used to identify line segments which are parallel to the specified coordinate axis. These parallel-line-segment end points are then provided to another vector generator which defines the address of each of the points along the parallel-line-segments. Appropriate attribute values, for example intensity, are then stored in refresh memory at the address of each of the points.

It has been recognized that the above approach can be adapted for use in three-dimensional applications; more specifically, in solids modelling. In such case, a solid is defined by a number of surfaces, each surface being defined, in turn, by line segments which meet at vertices. In turn, each vertex can have a four coordinate definition: an "X" coordinate, a "Y" coordinate, a "Z" coordinate, and an "i" coordinate. The X, Y and Z coordinates locate the particular vertex in a three dimensional space relative to orthogonal axes. The "i" coordinate defines the intensity at the vertex.

Referring to FIG. 1, a system processor, not shown, first analyzes each of the surfaces which define the solid to be modeled. For each surface the system processor examines the line segments which make up the surfaces and breaks each surface down into triangular and trapezoidal portions, as described above. For each of these triangular or trapezoidal portions, the system processor determines the coordinate values for the end points of the portions of the line segments which bound them. These coordinate values, as above, include X, Y, Z and intensity coordinate values.

Thereafter, the system processor provides these coordinate values on system bus 400 to three sets of vector generators. The first set of vector generators includes VG1, VG2 and VG3. The second set of vector generators includes VG4, VG5 and VG6. The third set of vector generators includes VG7, VG8 and VG9.

VG1, VG2 and VG3 generate two dimensional addresses of the pixels representing the surface. For example these addresses can be in the X,Y coordinate dimensions. As was described in the above referenced patent applications, and as also described herein, the addresses are preferably generated to define line segments parallel to one of the two coordinate dimensions or axes, for example the X-axis. In this manner, each coordinate value along the other coordinate dimension, for example, the Y-axis, can be said to correspond to a different one of the parallel line segments which fill the surface. Thus, the coordinates along this other coordinate dimension can be used to synchronize the generation of coordinate values along each of the different parallel line segments, even in a third dimension or axis. Coordinates of the surface along this "other" coordinate axis will be referred to herein as the "common coordinates" and this "other" coordinate axis will be referred to herein as the "common coordinate axis."

VG1, VG2, AND VG3 generate the addresses of the pixels representing the surface in terms of the common coordinate axis and the selected parallel axis, for example, the x,y axes.

VG5, VG6, and VG7 generate the addresses of the pixels representing the surface in terms of the common coordinate axis and the remaining coordinate axis, for example the y,z coordinate axes.

Thus, where y-axis coordinate values are the common coordinates, for each x-axis coordinate value generated by VG1, VG2, and VG3, a corresponding z-axis coordinate value is generated by VG4, VG5, and VG6. For each new y-axis coordinate value indicated by VG1, VG2, and VG3, a corresponding set of z-axis coordinate values will be generated by VG4, VG5, and VG6 for each x-axis coordinate value generated by VG1, BG2, and VG3 corresponding to the new Y-axis coordinate value.

Finally, VG7, VG8, and VG9 generate attribute values, such as intensity, for each of the pixels addressed by the x, y and z coordinate values being generated by VG1 through VG6. This is done in much the same manner as the earlier described surface fill.

At this point, a more detailed description of the surface fill method and apparatus of the above referenced patent applications will be helpful in appreciating the operation of the present invention. Referring to FIG. 2, a visual display apparatus 10, such as a cathode ray tube, receives and displays information from a shift register 12 and screen refresh RAM 14 via line 16 and line 18. In the visual display shown, a resolution of 1280×1024 pixels is provided, and a pixel is displayed at a rate of one pixel per ten nanoseconds. In the embodiment shown, shift register 12 receives 80 pieces of information from screen refresh RAM 14, in parallel, once every 800 nanoseconds. Shift register 12 thereafter shifts this information to visual display 10 via line 16 in a serial manner at a rate of one item of information per 10 nanoseconds. The addressing by which this transfer of information is controlled is generated by screen refresh RAM read circuitry, which is a part of the system processor 25.

It is to be understood that, in the typical video graphics system, each pixel of the video display 10 can have a number of different attributes. In order to specify these attributes, the data supplied to the visual display means 10 for each pixel includes a number of bits, i.e., a word of information. In order to provide these words of information, several planes of screen refresh RAM are typically provided with corresponding shift registers, wherein each plane provides one bit of information for the word corresponding to a particular pixel. For purposes of simplifying the explanation of the present invention, only a single plane of screen refresh RAM will be discussed, it being understood that the discussion is equally applicable to multiple planes of screen refresh RAM.

In order to write information into screen refresh RAM 14, a Y address is supplied on line 20, an X address is supplied on line 22, and write enable signals are supplied on line 24. Data are supplied to screen refresh RAM 14 from the system processor 25 via line 26.

The Y address is supplied to line 20 by a Y address preset counter 28. The system processor 25 provides the preset information to Y address preset counter 28 via line 30.

The X address and information for the write enable signals are generated by X address preset counter 32. The preset X address is supplied from the system processor 25 via line 34. A portion of the X address generated by X address preset counter 32 is supplied to line 22 as the X address to screen refresh RAM 14, while the remainder of the address is provided to a binary-to-80 decoder 36 Binary-to-80 decoder decodes the address information from X address preset counter 32 to provide a signal on one of 80 lines which are collectively referenced as line 24. Y address preset counter 28 and X address preset counter 32 are incremented or decremented by commands from vector generator 38.

Vector generator 38 receives information from the system processor by which it generates the decrement and increment control signals to the Y address preset counter and the X address preset counter, and by which vectors of data can be written into screen refresh RAM 14. Typically, the system processor supplies the vector generator 38 with the following information: (1) the magnitude of the change in the X direction, (2) the magnitude of change in the Y direction, (3) the direction of change in the X direction, i.e., the sign of X, (4) the direction of change in the Y direction, i.e., the sign of Y, and (5) a command to generate the address for the next pixel of data.

From this information, the vector generator determines the optimal sequence of pixel addresses by which the vector can be generated, from the given starting point to an end point which is displaced from the starting point by the X and Y displacements specified, and in the directions specified. The Y preset and X preset information supplied to the Y address and X address preset counters 28 and 32, respectively, provide the starting point for the vector being generated. Therefore, the end point of the vector being generated is defined by the displacement and direction information from the system processor.

Vector Generator

One embodiment of a vector generator which can be used in the present invention is shown in FIG. 32. As discussed above, the vector generator receives magnitude data for the amount of change desired in the X and the Y coordinate directions, as well as the direction of change. The vector generator shown in FIG. 3 implements what is known as the Bresenham vector generation algorithm. This algorithm is well known in the art and is discussed in a paper published in the IBM Journal, Vol. 4, No. 1, pages 25–30, 1965. The Bresenham algorithm provides an optimal sequence of addresses by which a vector can be written into a bit-map type memory which vector connects a starting point to an ending point. As is the case in most digital display systems, in order to display a line which is angled from the horizontal or vertical dimension of the display, such angled line is required to be constructed from a sequence of short horizontal and vertical line segments. When the resolution of the visual display is high enough, these connected line segments appear to the viewer as the desired angled line. The Bresenham algorithm provides a method for specifying the number, placement and interconnection of these horizontal and vertical line segments using only addition or subtraction operations.

In operation, the Bresenham algorithm divides the plane in which the vector lies into octants which are referenced to the starting point of the vector, and then determines in which octant the vector is positioned. An octant corresponds to a pie-shaped segment subtending a 45° angle. For a vector lying in a given octant, the Bresenham algorithm then specifies whether the next pixel of information to be written should be in the storage site wherein only one coordinate of the address is incremented/decremented, or both coordinates of the address are incremented/decremented.

As an example, see FIG. 4, wherein a vector is generated from a starting point corresponding to an X,Y address of (75, 62) and ends at an ending X,Y address of (83, 65). Each circle represents the location of a pixel which is to be written. As can be seen from the upper portion of the figure and indicated by the arrows and circles lying along the grid, the Bresenham algorithm provides the increment and decrement control signals by which the addresses generated and supplied to the screen refresh RAM 14 are made to correspond to the circles shown in the figure. Thus, in the first subsequent address from the starting point, the Bresenham algorithm would specify that only the X address be incremented. For the next pixel address, the Bresenham algorithm specifies that both the X and the Y address be incremented. In FIG. 4, the example illustrates the Bresenham algorithm for a vector located in the first octant. For other octants and directions, the address changes specified by the Bresenham algorithm are provided in Table 1.

As can be seen from Table 1, the octant in which the vector lies can be determined by the sign of the change in the X direction, the sign of the change in the Y direction, and whether the magnitude of the change in the X direction is greater than the magnitude of the change in the Y direction. Thus, for example, if the sign of the X change is positive, the sign of the Y change is negative, and the magnitude of the X change is greater than the magnitude of the Y change, the vector is indicated as being located in octant number 7.

TABLE 1

| Sign X | Sign Y | Mag X greater Mag Y | Octant | Sign of Gradient | Incr X | Decr X | Incr Y | Decr Y |
|---|---|---|---|---|---|---|---|---|
| + | + | Yes | 0 | − | 1 | 0 | 0 | 0 |
| + | + | Yes | 0 | + | 1 | 0 | 1 | 0 |
| + | + | No  | 1 | − | 0 | 0 | 1 | 0 |
| + | + | No  | 1 | + | 1 | 0 | 1 | 0 |
| − | + | No  | 2 | − | 0 | 0 | 1 | 0 |
| − | + | No  | 2 | + | 0 | 1 | 1 | 0 |
| − | + | Yes | 3 | − | 0 | 1 | 0 | 0 |
| − | + | Yes | 3 | + | 0 | 1 | 1 | 0 |
| − | + | Yes | 4 | − | 0 | 1 | 0 | 0 |
| − | + | Yes | 4 | + | 0 | 1 | 0 | 1 |
| − | + | No  | 5 | − | 0 | 0 | 0 | 1 |
| − | + | No  | 5 | + | 0 | 1 | 0 | 1 |
| + | − | No  | 6 | − | 0 | 0 | 0 | 1 |
| + | − | No  | 6 | + | 1 | 0 | 0 | 1 |
| + | − | Yes | 7 | − | 1 | 0 | 0 | 0 |
| + | − | Yes | 7 | + | 1 | 0 | 0 | 1 |

Also shown in Table 1 are the increment and decrement commands supplied by the vector generator 38 as a function of the octant in which the vector is located, and the sign of a number called the gradient. This gradient is determined by the following equations:

$$\nabla_1 = 2\Delta b - \Delta a \tag{1}$$

$$\nabla_i + 1 = \Delta_i + 2\Delta b - 2\Delta a, \text{ if } \nabla_i > 0 = \nabla_i + 2\Delta b, \text{ if } \nabla_i \leq 0 \tag{2}$$

where the values of $\Delta a$ and $\Delta b$ are equal to the magnitude of the change in the X direction or the change in the Y direction, depending upon the octant in which the vector lies. Thus, if the vector lies in octant 0, $\Delta a$ will be equal to the magnitude of the change in the X direction, while $\Delta b$ will be equal the magnitude of the change in the Y direction. Conversely, if the vector were in octant number 5, $\Delta a$ will be equal to the magnitude of the change in the Y direction, while $\Delta b$ will be equal to the magnitude of the change in the X direction. Given the assignment of values for $\Delta a$ and $\Delta b$, equations 1 and 2 are utilized to determine the value of the gradient of the address for the next pixel; i.e., pixel $i+1$, see equation (2). Equation (1) provides the value of the gradient for the starting point of the vector.

From equation (2), the sign of the gradient for pixel $i+1$ is used along with the octant location of the vector in order to designate whether the X,Y addresses will be incremented or decremented. This can be seen in the six right-most columns of Table 1. Thus, if the vector lies in octant 3 and the sign of the gradient is negative, the X address will be decremented while the Y address will be incremented. Similarly, if the vector lies in octant 6, and the sign of the gradient is negative, only the Y address will be changed, in this case decremented.

Referring to FIG. 3, direction ROM 74 implements the contents of Table 1. Direction ROM 74 receives the sign of the change in the X direction, the sign of the change in the Y direction, an indication whether the magnitude of the X direction change is greater than or equal to the magnitude of the Y direction change, and the sign of the gradient. The determination of the octant within which the vector lies is accounted for in the arrangement of the contents of direction ROM 74 in relation to the values of the sign of the X change, the sign of the Y change, the sign of the gradient, and the relative magnitude of the X and Y change.

As can be seen from Table 2 and from Table 1, the values for $\Delta a$ and $\Delta b$ can be assigned according to whether the change in the X direction is greater than or equal to the change in the Y direction or is less than the change in the Y direction. If the change in the X direction is greater than the change in the Y direction, then $\Delta a$ would be assigned the change in the X direction quantity, while $\Delta b$ would be assigned the change in the Y direction quantity. Conversely, if the change in the X direction is less than the change in the Y direction, $\Delta a$ would be assigned the change in the Y direction quantity while $\Delta b$ would be assigned the change in the X direction quantity. The relative magnitude determination and the assignment of the $\Delta a$ and $\Delta b$ quantities are performed within the gradient determination circuitry 76. Gradient circuitry 76 implements equations (1) and (2).

TABLE 2

| OCTANT | $\Delta a = \lvert \Delta - \rvert$ | $\Delta b = \lvert \Delta - \rvert$ |
|---|---|---|
| 0 | X | Y |
| 1 | Y | X |
| 2 | Y | X |
| 3 | X | Y |
| 4 | X | Y |
| 5 | Y | X |
| 6 | Y | X |
| 7 | X | Y |

Within gradient circuitry 76, comparator 76 receives the magnitude of the X change and magnitude of the Y change and provides an indication at its output as to whether the change in the X direction is less than the change in the Y direction. This indication is inverted by inverter 82 to provide an indication as to whether the change in the X direction is greater than or equal to the change in the Y direction. This indication is supplied to direction ROM 74 and to the select inputs of multiplexers 84 and 86. Multiplexer 84 receives the change in the Y direction quantity as its first input and the change in the X direction quantity as its second input. Conversely, multiplexer 86 receives the change in the X direction as its first input and the change in the Y direction quantity as its second input. As such, when the change in the X direction quantity is larger than the change in the Y direction quantity multiplexer 84 will provide at its output the change in the Y direction quantity, while multiplexer 86 will provide at its output the change in the X direction quantity. Conversely, when the change in the X direction quantity is less than the change in the Y direction quantity, multiplexer 84 will supply the X direction quantity at its output, while multiplexer 86 will provide the Y direction quantity at its output. It should be noted that the inverted output of multiplexer 82 is utilized. This is so that a 2's complement subtraction can be used in this implementation.

The inverted output of multiplexer 84 provides the inverted $\Delta a$ element while the output of multiplexer 86 provides the $\Delta b$ element of equations (1) and (2). Summer 88 receives the output from multiplexer 84 at one of its inputs, and the output from multiplexer 86, which has been shifted upwards one bit, at its other input to provide an output quantity representative of equation (1). The input received from multiplexer 86 is shifted upwards by one bit, where the added bit is a logic zero, so that the effect of this shift is to multiply the inputted quantity by two. Thus, the output of summer 88 will be two times $\Delta\beta$ minus $\Delta a$.

Similarly, summer 90 receives the output from multiplexer 84 and shifts this quantity upwards by one bit. Here, because an inverted quantity is being received, the added bit is assigned a logic 1 state. The summer 90 also receives the output from multiplexer 86 and shifts this output upward by one bit, wherein the added bit is a logic zero. As before, this effectively multiplies a quantity by two. Thus, the output of summer 90 is two times $\Delta b$ minus two times $\Delta a$. Multiplexer 92 receives the output from summer 90 at its first input and the output from multiplexer 86 at its second input. The quantity received by multiplexer 92 from multiplexer 86 is shifted upward by one bit, where the added bit is a logic zero, so as to multiply the quantity by two. The output of multiplexer 92 is selected to correspond to the quantity at either the first input or second input, depending upon the sign of the gradient. The sign of the gradient is the most significant bit of the output of gradient circuitry 76

In the embodiment shown in FIG. 3, wherein 16 bit words are used, the sign of the gradient will be found in the 16th bit. If the sign of the gradient is positive, multiplexer 92 will output the quantity received from summer 90. On the other hand, if gradient is negative, multiplexer 92 will output the quantity, which is then multiplied by two, received from multiplexer 86. The output of multiplexer 92 is added, in summer 94, to the gradient quantity which is fed back from the output of gradient circuitry 76, via line 96. This gradient quantity represents the gradient quantity for the previous iteration, i.e. the gradient for pixel i.

The output from summer 94 thus provides an output which satisfies equation (2) above.

Multiplexer 96 permits the selection of the initial condition described by equation (1) above when the vector generator first begins the generation of a new vector. Thus, multiplexer 96 receives at its first input the output from summer 88 and receives at its second input the output from summer 94. An initial condition select signal is applied to the select input of multiplexer 96 from the system processor 25. Thus, when the vector generator initially begins generation of the new vector, summer 88 will provide at its output a quantity representative of the relationship two times $\Delta b$ minus $\Delta a$. Thereafter, multiplexer 96 will provide an output which corresponds to the output of summer 94.

Latch 98 receives the gradient information from multiplexer 96 and holds this quantity for use in the next iteration. The output of latch 98 is thus provided via line 97 to summer 94 and multiplexer 92. Also, the most significant bit, being the sign bit of the gradient, is supplied to direction ROM 74.

In the above manner, equations (1) and (2) and Tables 1 and 2 above are implemented in the present invention.

Referring to FIG. 4, an example of the operation of the Bresenhem vector generator is provided. Shown in the upper portion of FIG. 4 is a portion of the visual display screen. A vector, indicated by reference numeral 100, is desired to be written beginning at X,Y starting point (75, 62) and ending at X,Y point (83, 65). Thus, the change in the X direction, which is positive, totals eight units while the change in the Y direction, which is also positive, totals three units. From Table 1, it can be seen that the vector is located in octant zero.

In the lower portion of FIG. 4, the first column corresponds to the gradient; the second column corresponds to the scan line address of the storage site into which the pixel is to be written; the third column corresponds to the address of the block of storage sites within the scan line which contains the pixel to be written into; and the fourth column corresponds to the storage site within the addressed block which is to receive the pixel. Shown underneath the column headings are the bit numbers for each of the addresses. The scan line address, in column 2, includes 10 bits. The block address, in column 3, includes 4 bits, while the site address includes 7 bits.

The first set of addresses can be seen to correspond to the X,Y starting address (75, 62). On the first iteration, the gradient is determined to be a negative 2. From Table 1, it can be seen that in octant zero, whenever the sign of the gradient is negative, only the X address will be incremented. Thus, in the top portion of FIG. 4, it can be seen that, for the first iteration, only the X address is incremented. Thus, in column 4, the site address is seen to be increased by one.

For the next iteration, the gradient is determined to be a positive 4. From Table 1, it can be seen that for octant zero, and a positive gradient, both the X and Y addresses are to be incremented. Thus, from the top of FIG. 4 it can be seen that the next pixel is written into a location wherein both the X and Y addresses have been incremented. This is reflected in the second and fourth columns of FIG. 4.

Referring to the fourth and fifth iterations in FIG. 4 and specifically column 4, it can be seen that between the fourth and fifth iterations, the site being addressed crosses the block boundary i.e., moves from address 79 in block 0000 to address 1 in block 0001. On the next iteration, the X address is incremented, in accordance with Table 1, and the storage site addresses make a transition from the 79th storage site in block 0000 to the first storage site in block 0001.

The circuitry of vector generator 38 can be implemented by commercially available parts. Suitable commercial part numbers for the various functional blocks shown in FIG. 3 are provided in Table 3.

TABLE 3

| Functional Block | Commercial Part No. | Manufacturer |
|---|---|---|
| Comparator 78 | 74LS85 | Signetics Corp., Sunnyvale, CA |
| Multiplexer 84 | 74LS158 | Signetics Corp., Sunnyvale, CA |
| Multiplexer 86 | 74LS157 | Signetics Corp., Sunnyvale, CA |
| Summer 88, 90 | 74LS283 | Signetics Corp., Sunnyvale, CA |
| Multiplexer 92, 96 | 100155 | Motorola, Inc., Phoenix, AZ |
| Summer 94 | 100180 | Motorola, Inc., Phoenix, AZ |

TABLE 3-continued

| Functional Block | Commercial Part No. | Manufacturer |
|---|---|---|
| Latch 98 | 100141 | Motorola, Inc., Phoenix, AZ |

Surface-Fill or Polygon-Fill

FIG. 2 illustrates the interaction of the surface fill circuitry with the system processor 25 and the vector generator circuitry 38. The surface fill circuitry includes a coordinate data generator 200, which is similar to vector generator 38; a presettable counter 202, which is similar to X address preset counter 32; and sequencer circuitry 204. Coordinate data generator 200 receives line segment data from system processor 25 via data bus 206. This line segment data includes the sign of the change in the X direction, the sign of the change in the Y direction, the magnitude of the change in the X direction, and the magnitude of the change in the Y direction for the line segment being evaluated. Counter 202 receives the X address starting point for the line segment from system processor 25 via data bus 206.

Sequencer circuitry 204 receives control instructions from and supplies status information to system processor 25 via control/status bus 208. In turn, sequencer circuitry 204 coordinates the operation of the surface fill circuitry with that of the vector generator 38 and system processor 25 so that a smooth and efficient transaction in operation between vector generation and surface fill generation is obtained. Finally, system processor 25 receives data from coordinate data generator 200 and counter 202 via bus 210.

Coordinate data generator 200 operates in substantially the same manner as the circuitry in vector generator 38. In response to magnitude and sign data supplied to it from the system processor 25, the coordinate date generator provides increment and decrement instructions for X and Y addresses, where the X and Y addresses define points which collectively form a line segment on visual display 10. As with vector generator 38, coordinate data generator includes a gradient processor 212 which operates in substantially the same manner as gradient circuitry 76 in FIG. 3, and direction ROM 214, which operates in substantially the same manner as direction ROM 74 in FIG. 3.

Note, however, that in FIG. 2, system processor 25 receives current processor parameters from gradient processor 212 via bus 210 and lines 216. These processor parameters represent the current value being provided by the gradient processor 212 for equation (2) above. Referring to FIG. 3, the portion of the gradient processor circuitry 76 at which these processor parameters are available can be seen where lines 97 emerge from latch 98. The current processor parameters provided to system processor 25 on lines 216 are provided from a like point in gradient processor 212. As discussed earlier in the specification, the data on line 216 reflects the current magnitude of the gradient as determined by equation (2), supra.

A further difference is that, in the surface fill circuitry, the increment and decrement Y signals are not used to control a presettable counter, such as Y address preset counter 28. Instead, the increment Y and decrement Y signals are supplied to system processor 25 via bus 210 and line 218.

In all other respects, gradient processor 212 operates in substantially the same manner as gradient processing circuitry 76; direction ROM 214 operates in substantially the same manner as direction ROM 74; and counter 202 operates in substantially the same manner as X address preset counter 32; all of the latter being discussed in detail above.

The operation of the invention can be best understood by way of example. FIGS. 6a through 6c, and the flow chart of FIG. 5 illustrate the generation of a surface fill table, and then the use of the surface fill table to fill in a surface bounded by a plurality of line segments. In FIG. 6a, a surface is shown which is bounded by line segments AB, BC, CD, DE, EF, FG and GA. In operation, line segment data defining each of these line segments are either supplied by the user to the system or calculated at another point in the system operation. The line segment data for each of the line segments include the starting point of each line segment, the magnitude of change in the X and Y direction, and the sign of the change in the X and Y direction.

As indicated in FIG. 5, system processor 25 loads the line segment data for a particular line into the surface fill circuitry, step 220. Thus, for line segment AB, gradient processor 212 will receive an X-change magnitude of 5 and a Y-change magnitude of 4. Direction ROM 214 will receive a negative value for sign X and a negative value for sign Y. Finally, preset counter 202 will receive an X address preset of 5.

In step 222 of FIG. 5, system processor 25 sends an instruction via sequencer circuit 204 to cause the surface fill circuitry to begin evaluating the current line segment. As a result of this evaluation, increment and decrement instructions are output by direction ROM 214 to X address preset counter 202 and OR gate 224. Referring to FIG. 6a, the increment/decrement instructions from direction ROM 214 define points 226, 228, 230, 232 and 234. For point 226, the instruction would be to decrement both the X and the Y address; for point 228, the instruction would be to decrement both the X and the Y address; however, for point 230, the instruction would be to decrement the X address only. Finally, in connection with points 232 and 234, the instructions would be to decrement both the X and the Y addresses. These instructions are shown in symbolic form by the arrows which connect the points together.

In a similar manner, coordinate data generator 200 generates instructions which are definitive of points for the other line segments which bound the surface to be filled.

However, rather than generating the actual line segment from the supplied instructions, as was the case with the circuitry of vector generator 38, the instructions are evaluated by system processor 25 to derive end point information therefrom. To do this, system processor 25 in steps 236 and 238, FIG. 5, examines the increment/decrement instruction for the Y address and records the address present in counter 202 whenever there is an instruction to increment or decrement the Y address. By monitoring the decrement/increment instructions in this manner, the end points for parallel line segments can be obtained, which line segments collectively fill in the surface of interest.

This can be more clearly seen in FIGS. 7a and 7b wherein the end points derived by the present invention are illustrated. FIG. 7a illustrates the collection of points which would be normally defined by the decrement/increment instructions from coordinate data generator 200 for each of the line segments. In FIG. 7b, a box around a particular point indicates that such point would be selected by system processor 25 as an end point for one of the parallel line segments. Thus, with respect to line segment AB, points 226, 228, 232 and 234 would be selected as end points, while point 230 would not be selected as an end point.

The instructions for each of the selected points include an instruction to change the Y address, while the instruction for the generation of point 230 includes only an instruction to decrement the X address. As can be seen in FIG. 7b, by selecting as end points those addresses which result from an instruction to change the Y address, there is provided a consistent scheme by which, for any particular line segment, a single X address is designated as the end point address for each Y address of the line segment.

In a similar manner, X address end points are selected for each of the line segments and correlated to their corresponding Y address. When the selected points having a common Y address are examined, these points will constitute the end points for a horizontal line corresponding to that particular Y position. Thus, in FIG. 7b, it can be seen that there would be two end point addresses correlated to a Y address of 1: That for point 226 and that for point 240. Similarly, for Y address 3, the correlated end points would be that of point 232 and point 242. FIG. 7c illustrates the correlation of the end points as a function of their Y address and grouped by their corresponding line segment.

The order in which each line segment is evaluated, and the order in which the surface fill table is constructed has many variations. Preferably, the order of evaluation and formation should be selected to minimize the amount of time required between a request by the user to fill a space in and the actual accomplishment of the operation on a visual display. One sequence which has been found to be satisfactory in minimizing the required of time is illustrated in FIGS. 6b and 6c and in the flow diagram of FIG. 5.

The scheme involves dividing the surface to be filled-in into a number of subdivisions. The division between each subdivision is selected to occur at each end point of a line segment and to extend in the Y dimension across the surface until it intersects with a line segment on the opposite boundary of the surface. Thus, in FIG. 6b, segment AG has an end point G. A hypothetical horizontal line segment is extended across the surface until it intersects with a point on line segment AB. This point is labelled AB' in FIG. 6b. Similarly, line segment AB has an end point B. A hypothetical horizontal line is extended across the surface from point B until it intersects with a point on line segment GF. This point is labelled FG" in FIG. 6b. This process continues until subdivisions corresponding to the various end points are defined in a similar manner. Thus, as is shown in FIG. 6b, the surface can be subdivided into a number of subdivisions, among those subdivisions being subdivision A-AB'-G, B-AB'-G-FG", BC'-B-FG"-FG', C- BC'-E-DE', F-E-FG', and D-C-DE'.

Flagging the end points of the line segments in this manner also permits the processor to distinguish concave portions of the surface. As can be seen from FIG. 6a, the portion of the surface bounded by line segments DE and EF is concave. If the processor 25 were to process line segments BC and GF without knowledge of line segments DE and EF, horizontal line segments would be defined which extend outside of the surface and through the portion of the visual display below line segments DE and EF. With the Y address corresponding to point E flagged, processor 25 will be alerted to the existence of the concave condition of the surface.

As can be seen from FIG. 6b, the end points for the horizontal segments of the subdivisions above do not necessarily fall directly on one of the original line segments, AB, AG, GF, FG, ED, DC or CD. Instead, the end points are selected from among the points which are generated from the information provided by the coordinate data generator 200. Thus, it can be seen that the specific X coordinate of each end point need not be determined beforehand. Instead, the Y coordinate for the end point of each line segment is flagged, e.g., for line segment AG, the Y coordinate of 1 is flagged.

For the line segments shown in FIG. 6b, the flagged Y values would include 0, 1, 4, 6, 8, 9 and 11. When the coordinate data generator 200 is processing a particular line segment, and provides an instruction to change the value of the Y coordinate, such that a flagged Y coordinate is produced, the system processor 25 will be alerted that the end of a subdivision has been reached, and that appropriate action should be taken.

Thus, in processing segment AB, for example, system processor 25, upon reaching a Y value of 1, would know that the end of a subdivision had been reached. As shown in FIG. 5, step 244, the system processor would then proceed to step 246 to save the current position data on line 216 from coordinate data generator 200. System processor 25 would then proceed to step 248 to determine whether the line segment on the other side of the subdivision had been processed. If not, the line segment data for the segment bounding the other side of the surface subdivision would be loaded into the coordinate data generator 200 and processed. In the current example, the line segment data for line segment AG would be loaded into the coordinate data generator 200 and processed through steps 222, 236, 238 and 244 in FIG. 5.

For each set of instructions provided by coordinate data generator 200, the system processor 25, in step 250, determines whether the end point of a segment has been reached. If not, the system continues to execute steps 222, 236, 238, 244 and 250 until the end of the segment is reached. If, in step 250, it is determined that the end of the segment has been reached, the system processor 25 verifies, in step 248, that the other side of the subdivision has been processed. If so, system processor 25 transfers the data from the surface fill table into vector generator 38 to cause the subdivision to be filled; see step 252.

Thereafter, the system processor returns to step 220 and loads in the data for the next line segment. If a line segment has not been completely processed, such as line segment AB in the present example, the current position data that was stored when the flagged Y value was reached is reloaded into the gradient processor 212 of coordinate data generator 200 and the processing of line segment AB is resumed. This operation saves valuable operating time, in that the gradient process 212 need not reprocess the line segment data anew in order to get to the state it was in when processing was halted.

To continue the present example, after system processor 25 has caused subdivision AB'-A-G to be filled in, in step 252, it returns to point AB' of line segment AB, in step 220, and loads the position data for that point into processor 212 via line 206. Coordinate data generator 200 then continues processing line segment AB, starting from point AB', and coordinates the X address value for each change in Y address value, until either a flagged Y address is reached, or the end of the segment is reached. In the example of FIG. 6b, no further flagged Y values would be found in the evaluation of line segment AB.

When the end of the line segment is reached, the system processor, in step 250, will proceed to step 248 in which the line segment for the other side of the subdivision would be processed. In this case, the line segment would be line segment GF. In step 253, the line segment data for line segment GF would be loaded into coordinate data generator 200 and processing of the segment would proceed in step 222. As can be seen from FIG. 6b, the Y coordinate which corresponds to point B would be flagged so that when point FG" is reached, system processor 25 will proceed from step 244 to step 246. The current position data would be saved in step 246, and in step 248, it would be determined that the other side had already been processed. Thus, the system processor 25 would proceed to step 252 to cause the data from the surface fill table to be transferred to vector generator 38 to fill in subdivision B-AB'-G-FG".

Referring to FIG. 6c and FIG. 7c, the surface fill operation will now be discussed in greater detail. The surface fill table for the subdivision would include the Y and X addresses indicated by bracket 254 in FIG. 7c. As mentioned earlier, vector generator 38 can be the type which accepts end point information or one which accepts magnitude and direction information. In the embodiment shown in FIG. 2, generator 38 utilizes direction, magnitude, and starting point information. Thus, system processor 25 would convert the end point information from the surface fill table into starting point, direction and magnitude information. Furthermore, because the vectors utilized to fill a surface are parallel to a selected dimension, in this case, the Y coordinate dimension, it can be assumed that the magnitude of change in the selected dimension, i.e., the Y dimension, will be 0 for points in any one of the surface-fill vectors. Thus, the only information required to be supplied to vector generator 38 by system processor 25 would be the starting point of a vector, the magnitude of change in the X direction and the direction of change in the X direction.

It is to be noted that, because there is no change in the Y direction, and because both end points for each horizontal fill vector are provided by the surface fill table, system processor 25 can specify that a particular vector start from either the left side or the right side of the surface. Thus, this information can be specified to optimize the efficiency of the surface fill operation.

In the case where system processor 25 designates that all horizontal fill vectors start from the lefthand side of the surface, the information shown in Table 4 would be provided by system processor 25 to vector generator 38 on a vector-by-vector basis. Thus, as shown in FIG. 6c, surface B-AB'-G-FG" would be filled in by a plurality of parallel, horizontal vectors indicated by the "X" marks.

TABLE 4

| Surface Fill Information for B-AB'-G-FG" | | | |
|---|---|---|---|
| Starting Point (X,Y) | \|ΔY\| | \|ΔX\| | SIGN X |
| (4,1) | 0 | 6 | + |
| (3,2) | 0 | 7 | + |
| (1,3) | 0 | 8 | + |
| (0,4) | 0 | 9 | + |

In a similar manner, each of the line segments which bound the surface would be processed. As a flagged Y value in a line segment is reached, the system will process all other line segments which bound the corresponding subdivision, and upon completion of processing the particular line segment, cause the subdivision to be filled in with horizontal parallel vectors. This process continues until the processing of all line segments has been completed.

It is to be understood that the Y dimension has been chosen to be the dimension to which the surface fill vectors are made parallel because of the nature of typical raster scanning displays. In these displays, an electron beam is swept across the screen in a horizontal direction so that a plurality of parallel horizontal lines are generated. Thus, the choice of using vectors parallel to the horizontal dimension minimizes the amount of information required to be supplied to a vector generator in order to generate such vectors. It is also to be understood that in other types of raster scanning display apparatus, such as where the scan lines are oriented vertically, the surface fill vectors will be chosen to be parallel to the vertical dimension, or whatever dimension minimizes the amount of information required to be supplied to a vector generator for generating such surface fill vectors.

Referring to FIG. 8a, an alternate embodiment of the present invention will now be described. There, instead of a single coordinate data generator circuit 200, two such circuits 200 and 201 are utilized in parallel. With such a configuration, both line segments of a subdivision can be processed simultaneously and the surface fill vector information supplied to the vector generator 38 on a near real time basis. Thus, for example, coordinate data generator 200 will receive the left side line segment information from system processor 25 via data bus 206, while coordinate data generator 201 would receive the data for the right side line segment via data bus 206 from system processor 25. Upon completion of the loading step, step 254 in FIG. 9, both coordinate data generators would be run in parallel in step 256.

As can be seen in FIG. 8a, the decrement/increment X instructions from coordinate generator 200 control X position counter 202, as before. The decrement/increment X instructions from coordinate data generator 201 control the operation of X position counter 203. X position counter 202 is preset with the X address starting point for the left side line segment of a subdivision, while X position counter 203 is preset with the starting X address of the right side line segment. The output of each counter is connected to magnitude circuit 258 which, instantaneously, calculates the magnitude of the difference between the outputs of the two counters. Additionally, the output of X position counter 202 controls circuit 260.

As before, the decrement/increment Y instructions from coordinate generator 200 are input to OR gate 224. Similarly, the decrement/increment Y instructions from coordinate generator 201 are connected to OR gate 225.

The output of OR gate 224 is supplied to system processor 25 via sequence control circuit 204 to one input of AND gate 266, and to the input of latch 268. Similarly, the output of OR gate 225 is supplied to system processor 25 via sequence control circuit 204 to the other input of AND gate 266, and to the input of latch 270. The inverted output of latch 268 is connected to one input of AND gate 262, while the inverted output of latch 270 is connected to one input of AND gate 264.

The other input to AND gate 262 and 264 is the "next pixel" signal from data bus 206. Recall that the "next pixel" signal instructs the coordinate data generators 200 and 201 to generate the instructions for the next point in their respective line segments.

In the above structure, whenever a decrement/increment Y signal is output by either of the coordinate date generator 200 or 201. The associated latch circuits 268 and 279, respectively, are set to provide a logic zero to their respective AND gate 262 or 264. When this occurs, the "next pixel" signal is disabled from application to the coordinate data generator from which the decrement/increment Y signal originated. This temporarily suspends the operation of the associated coordinate date generator while permitting the other coordinate data generator to continue processing until a decrement/increment Y signal is produced therefrom. In this manner, the X position for the left side end point and for the right side end point will be present in the X position counters 202 and 203, respectively, when both OR gates 224 and 225 indicate that a decrement/increment signal is present from their respective coordinate data generators.

When such is the case, the output of AND gate 266 will be a logic one which will cause control circuit 260 to supply magnitude, sign, and starting address information to vector generator 38 and associated circuitry. Also, the output of AND gate 266 is provided to the enable line of vector generator 38 to begin the operation of vector generator 38.

The output of AND gate 266 is also connected to the reset inputs of latches 268 and 270. When AND gate 266 provides an output logic one, this removes the logic zero state from AND gate 262 and AND gate 264 to permit coordinate data generators 200 and 201 to continue to process their respective line segments.

Referring more particularly to control circuit 260, it can be seen that control circuit 260 receives the X position signal from X position counter 202, and thus provides a starting point to X address preset counter 32 which is taken at the left side of the surface to be filled. Also, control circuit 260 receives a signal which is representative of the magnitude of the difference between the X position from X position counter 203 and the X position from X position counter 202.

Control circuit 260 receives a Y address preset signal from signal processor 25 via data bus 206. This Y address preset signal is loaded into a preset counter 272 within control circuit 260. The count within preset counter 272 is updated for each logic one state out of AND gate 266. The output of counter 272 represents the current Y address or scan line of visual display which is written into. Thus, when a surface is being filled, the Y address preset information supplied to control circuit 260 from system processor 25 will be the first scan line which contains a point of the surface to be filled. In the case of the example shown in FIGS. 6a thlrough 6c and 7a through 7c, the Y address preset would be zero.

The operation of the just described circuitry will be more readily understood upon consideration of the flow diagram of FIG. 9. After the coordinate data generators 200 and 201 have been enabled in step 256, the system monitors the outputs of OR gate 224 and 225 to determine whether a change in the Y coordinate is in order. See step 274. If no Y change is in order, the system proceeds to step 276 to determine whether the end of a line segment has been reached by either coordinate data generator. If not, the system processor returns to step 256 and continues to permit the coordinate data generators 200 and 201 to process their respective line segments.

If, in step 274, a change in the Y address is in order, system processor 25 proceeds to step 278 in which the new Y address is examined to determine whether it has been flagged. If so, the current parameters from the gradient processor from which the decrement/increment Y instructions were received are recorded, step 280. Thereafter, or if the Y value has not been flagged, the operation of the gradient processor is suspended until the other coordinate data generator produces a decrement/increment Y signal, step 282.

In step 284, the other processor is permitted to continue processing until a change in the Y address is indicated. When this occurs, vector generator 38 is enabled, step 286, and the magnitude signal from magnitude circuit 258, the count in preset counter 272, and the starting X position from X position counter 202 are provided to vector generator 38. Also supplied are a Y magnitude of zero and a positive sign Y and a positive sign X. Upon receipt of this information, the vector generation circuitry described earlier generates the horizontal line corresponding to the information supplied. Thereafter, system processor 25 proceeds to step 288 in which it determines whether the current Y address was a flagged Y address. If not, system processor 25 returns to step 256 to continue processing the current line segment.

If, on the other hand, it is determined that the Y address was a flagged Y, the system processor 25 returns to step 254 to load in the current parameters of the appropriate coordinate data generator. The other coordinate data generator would be supplied by system processor 25 with the appropriate line segment data for the next subdivision of the surface to be filled in.

In the above manner, coordinate data generators 200 and 201 can provide starting point, magnitude and sign information to vector generator 38 on a vector-by-vector basis, with vector generator 38 writing one vector while the coordinate data generators are generating instructions for the next vector. As is evident, the above-described structure provides for a high-speed surface fill capability.

In a further alternative embodiment, the vector information from coordinate data generators 200 and 201 can be accumulated by system processor 25 for each subdivision of the surface to be filled. When the information for one subdivision is complete, system processor 25 can then transfer the information to vector generator 38 to permit vector generator 38 to fill in the subdivision all at once. This alternative embodiment can be obtained by the structure shown in FIG. 8a.

Hidden Surface Shading

The present invention extends the above surface fill concepts to handle hidden surface and shading problems. Preferably, the coordinate data generators 200 and 201, and vector generator 38 of FIG. 8a are replicated to form the three groups of vector generators: (VG1, VG2, VG3), (VG4, VG5, VG6), and (VG7, VG8, VG9).

It is to be understood that VG1-VG9 can be any differential drawing analyzers, and need not implement the Bresenham algorithm, as is the case in the preferred embodiment of the present invention.

VG1, VG4, and VG7 can correspond to coordinate data generator 200, while VG2, VG5, and VG8 can correspond to coordinate data generator 201. VG3, VG6, and VG9 can correspond to vector generator 38.

Preferably, VG6 and VG9 can have the structure shown in FIG. 8b. The difference between the structure of vector generator 38, FIG. 8a, and that shown in FIG. 8b is that the former operates upon sign and difference values of the line segments to be generated, while the latter operates upon the end points thereof. Further, the vector generator of FIG. 8b implements the Bresenhem algorithm in a manner similar to that of coordinate data generators 200 and 201.

For the sake of simplicity, FIG. 8b will be described in terms of the operation of VG6, it being understood that the structure for VG9 operates in a similar manner, except on different parameters. Thus, in FIG. 8b, a position counter 500 receives an $X_s$ preset value which corresponds to the starting point of the vector to be generated. The $X_s$ present value is received from the system bus 400 via VG1 and lines 502. Position counter 500 also receives increment/decrement $X_s$ signals from VG1 via lines 502. Recall that VG1 generates the starting and ending value in the X dimension for the surface fill line segments parallel to the X coordinate axis.

Position counter 504 receives an $X_e$ preset value from the system processor 25 via system bus 400 and VG1, and increment/decrement $X_s$ signals from VG1 via lines 502. This corresponds to the ending value of the line segment to be generated. Magnitude/sign circuit 506 receives the current starting and ending values from position counters 500 and 501 and determines the absolute magnitude and sign of the difference between the two values. The magnitude and sign information is supplied to gradient processor 508 and direction ROM 510, respectively.

Similarly, position counters 512 and 514 receive $Z_s$, increment/decrement $Z_s$ and $Z_e$, increment/decrement $Z_e$, respectively from VG4. From this information, position counter 512 and 514 can generate Z axis start and end values corresponding to the X axis start and end values being designated by VG1.

Magnitude/sign circuit 516 receives the current start and end values from position counters 512 and 514 and determines the absolute magnitude and sign of the difference between the values. This information is supplied to gradient processor 508 and direction ROM 510, respectively. Gradient processor 508 uses the absolute magnitude information to determine whether the absolute magnitude along the Z axis is greater than or equal to the absolute magnitude along the X axis, and also to determine the sign of the gradient. This information is supplied to direction ROM for use in conjunction with the sign X and sign Z information to generate increment/decrement X and increment/decrement Z signals for generation of the values intermediate the $X_s,Z_s$ and $X_e,Z_e$ values.

OR gate 516 receives the increment/decrement X signals from direction ROM 510 and provides an indication for use by controller 402, FIG. 1, in synchronizing the operation of the various vector generators. Counter 520 receives increment/decrement Z signals from direction ROM 510 and the current $Z_s$ value to generate the intermediate Z values. These Z values are supplied to comparator 422 and depth buffer 420, FIG. 1.

At the bottom of FIG. 8b it can be seen that gradient processor 508 receives a next point signal from AND gate 520. The output of AND gate 520 is a function of a next VG6 X signal from controller 402, FIG. 1, and a clock signal, and serves to synchronize the operation of VG6 with that of VG3 and VG9.

In a similar manner, the circuitry of FIG. 8b can be used to implement VG9, and in conjunction with VG7 and VG8, to provide intensity values for storage in refresh memory 14, FIG. 1. In this context, position counters 500 and 504, and magnitude/sign circuit 506 receive the same signals and operate in the same manner as described in connection with VG6. On the other hand, position counters 512 and 514 receive $i_s$, $i_e$, $i_s$ increment/decrement and $i_e$ increment/decrement signals from VG7 and VG8, respectively. Magnitude/sign circuit 516 determines the absolute magnitude of the difference between the start and end intensity values, and also determines the sign. Gradient processor circuit 508 receives the Δi and ΔX absolute magnitude information and signals the direction ROM 510 as to whether the one is greater than or equal to the other, and also supplies the sign of the gradient. In response to this, direction ROM provides increment/decrement X and increment/decrement i information.

As can be appreciated from comparing FIG. 1 with FIG. 8a VG3 in FIG. 1 is shown providing a current address on line 410 and an increment/decrement X signal on line 418, while vector generator 38, FIG. 8a, supplies increment/decrement X and increment/decrement Y signals to control Y address preset counter 28 and X address preset counter 32. VG3 can be implemented in practice in much the same manner as vector generator 38 combined with X address preset counter 32 of FIG. 8a. The current X address output of VG3 can be the output of X address preset counter 32 and the increment/decrement X signal can be the logical OR of the increment and decrement signals which supply inputs to X address preset counter 32.

In FIG. 1, the load signal, or Next Start/End signal, on line 408 from controller 402 is asserted when controller 402 determines that the current line segment being operated upon by VG3 has been completed. Thereafter new $X_s$ and $X_e$ values are brought into VG3 for processing.

Counter 412 is shown as separate from VG3 in FIG. 1. This is to indicate that VG3 only need be capable of generating values along the X coordinate axis, the Y value along the Y coordinate axis being constant for each set of $X_s$ and $X_e$ supplied by VG1 and VG2. As can be seen from FIG. 1, the Y value from counter 412 is changed each time VG3, VG6 and VG9 are instructed by controller 402, via line 418, to load in the next set of start and end points.

The Next-VG3-X signal from controller 402 causes VG3 to provide the next intermediate X value. The Next-VG3-X signal is issued by controller 402 after VG6 and VG9 have both indicated that they have reached the next X value.

The operation of the present invention can be best understood by examining an actual example.

FIG. 11a shows a prospective view of two surfaces ABCD and EFGH, where each of the capped letters represents a vertex of the identified surface. It can be seen that these two surfaces are three-dimensional in nature and, also, require the identification of hidden surfaces. This can be better seen in FIG. 11c in which the two surfaces are plotted in the X-Y plane and in which surface EFGH can be seen to be in front of surface ABCD.

From FIG. 11c it can be seen that surface ABCD need not be broken down further into trapezoids or triangles since line segments BC and AD are parallel to one another. Conversely, it can be seen that surface EFGH can be broken down into a triangle EE'H and a trapezoid E'FGH. In both cases, the X axis is selected as the dimensional axis with respect to which the surfaces are broken down and with respect to which the surface fill vectors are generated.

In operation, each of the surfaces of the solid to be generated are operated upon in sequence. In the example, assume that surface ABCD is first operated upon. As such, system processor 25 will determine that line segments AB and DC will each be operated upon. More specifically, the system processor 25 will supply X and Y end point values for line segment AB to VG1, and X and Y end point values for line segment DC to VG2. Alternatively, starting point, sign, and magnitude values for each of the line segments can be supplied to vector generators VG1 and VG2.

In the preferred embodiment to the present invention VG1 and VG2 are Bresenhem vector generators as described earlier herein. Once the line segment data are loaded into VG1 and VG2, controller 402 enables both VG1 and VG2. As described earlier herein, VG1 and VG2 operate upon the line segment data to define intermediate points of each line segment. The definition for these intermediate points can take the form of an actual X, Y address, or increment/decrement X commands and increment/decrement Y commands.

As described earlier herein, whenever a new Y coordinate value is indicated, this signifies the identification of a new end point for a surface fill vector. As described earlier herein, surfaces can be filled with vectors parallel to either the X or Y axis. In the present example and in the examples described earlier herein, vectors parallel to the X axis were utilized. In such a situation, each time VG1 or VG2 identifies a new Y coordinate value, this signifies a new vector parallel to the X axis.

The identification by VG1 and VG2 of a new Y coordinate is indicated to controller 402 by a signal from VG1 on line 404 and by VG2 on line 406. As indicated in FIG. 1, and as described above, this signal to controller 402 indicates that VG1 has found the next starting point for a surface fill vector and that VG2 has found the next end point for a surface fill vector.

It is to be noted that controller 402 keeps track of the next start and next end points found by VG1 and VG2, respectively, so that the next start and next end points identified by VG1 and VG2 correspond to the same Y coordinate value.

Once VG1 and VG2 have identified the next start and end points for a surface fill vector, VG3, another vector generator, is provided with the X coordinate values corresponding to the start and end points being identified by VG1 and VG2. When these X values are available from VG1 and VG2, controller 402 sends a load signal on line 408 to VG3 to cause the start and end X coordinate values to be loaded into VG3. Thereafter, VG3 generates the intermediate X coordinate values between the X start and X end values. These intermediate values are then provided on line 410 to address refresh memory 14.

As described earlier herein, a new vector parallel to the X axis is defined for each new value of Y between the start and end points of Y supplied to VG1 and VG2 by system bus 400. Thus, controller 402 causes VG3 to load in the next values for X start and X end, whenever all processing for the current vector parallel to the X axis has been completed. This also means that the next vector parallel to the X axis to be generated corresponds to a new Y coordinate value. The load signal from controller 402 on line 408 is thus used to bump counter 412 to its next Y value. Counter 412 is loaded with the Y start coordinate value for the series of line segments being operated upon by VG1 and VG2. Thus, for each set of intermediate X coordinate values generated by VG3, a corresponding Y address, or coordinate, is supplied by counter 412 to address the refresh memory 14.

Remaining with the example illustrated in FIG. 11a it can be seen from FIG. 1 that VG1 receives as one of its input the X and Y coordinates for vertex A and as its other inputs the X and Y coordinates of vertex B. The X and Y coordinates for vertex A can be considered the start points for line segment AB, while the X, Y coordinates for vertex B can be considered the end point for line segment AB. Similarly, VG2 receives X, Y coordinates for vertex D, and X, Y coordinates for vertex C as its inputs, with the X, Y coordinates for vertex D representing the start point for line segment DC, and the X, Y coordinates for vertex C representing the end points for line segment DC.

As VG1 evaluates line segment AB, it determines whether, for each iteration it performs, the X coordinate and/or Y coordinate is to be incremented/decremented. In the present example, it being assumed that line segments parallel to the X axis are to be generated, each time VG1 indicates that the Y coordinate is to change, this signifies that the corresponding X coordinate value from VG1 represents a new start value and the corresponding X coordinate from VG2 represents a new end value.

Vector generators VG4 and VG5 are shown in FIG. 1 as receiving the Y, Z coordinates for line segment AB, and for line segment DC, respectively. Again, because it is assumed that line segments parallel to the X axis are to be sought, thereby indicating that each change in the Y coordinate value represents a new line segment parallel to the X axis, VG4 will indicate on line 414 that the next start value for the Z coordinate has been found whenever the Y coordinate is changed. Similarly, VG5 will indicate on line 416 that a new end value for the Z coordinate has been found whenever a change in the Y coordinate is indicated. As with VG1 and VG2, controller 402 responds to these new start and new end signals by causing VG6 to load in the new start and end Z coordinate values from VG4 and VG5, respectively. At the same time, VG6 will load the start and end values for the X coordinate, corresponding to the same value of Y coordinate, from VG1 and VG2. This permits VG6 to define parallel line segments using X and Z start and end points, with the definition of each new value of X and Z being tied to the generation of a new value X coordinate value by VG3, all tied to the Y coordinate value.

Thus, VG6 is loaded with a new set of start and end X, Z coordinate values at the same time VG3 is loaded with a new set of X coordinate start and end values. VG6 generates its next Z value along the line segment, defined by the start and end X, Z coordinate values, each time VG3 generates a new X value on line 410. VG3 supplies on line 418 an indication to controller 402 that an increment/decrement X signal is being generated by VG3 and that VG6 should therefore generate its next Z value. In turn, controller 402 supplies a Next-VG6-x signal to VG6 to cause it to generate its next z coordinate value. It can therefore be seen that VG6 generates a Z value for each X, Y coordinate value generated by VG3. The Next-VG3-x signal from controller 402 to VG3 is used to permit VG6 and VG9 to complete their computations before VG3 is permitted to calculate the next X value.

Each of these generated Z values are compared against Z values previously stored in depth buffer 420 at the corresponding X, Y address. The stored Z value can correspond to Z values generated when other surfaces were evaluated. The previous Z value is compared against the current Z value by comparator 422. If the previous Z value, indicated by the letter A, is greater than the current B value, indicated by the letter B, this means that the point on the surface currently being analyzed is in front of the point on the previously analyzed surface. As such, comparator 422 supplies on line 424 a write enable signal to depth buffer 420 and also to refresh memory 14. Depth buffer 420 responds to the write enable signal by storing the Z value currently being generated by VG6 at the current X, Y coordinate address. If, on the other hand, comparator 422 determines that the currently generated Z value is greater than or equal to the previously generated Z value, no write enable signal will be issued on line 424.

Refresh memory 14 responds to the write enable signal from comparator 422 by writing the data received on line 426 into the address indicated by the currently generated X, Y coordinate values from VG3 and counter 412. Line 426 couples the output of vector generator VG9 to the data input of refresh memory 14.

Vector generators VG7, VG8 and VG9 provide intensity values on line 426 to refresh memory 14. VG7 and VG8 receive the Y and intensity coordinate values for line segments AB and DC. VG7 and VG8 generate start and end points for the intensity values correlated to each new Y value. In turn, VG9 receives the start and end intensity values for the particular line segments and generates intermediate intensity values. VG7, VG8 and VG9 implement what is known as GOURAD shading. Thus, it can be seen that VG7 and VG8 treat intensity much like line segments and generate change i and change Y signals. Each time a change Y signal is generated, a new Start-Found-Signal is provided to controller 402 from VG7 on line 428. Each time VG8 generates a change Y signal, this signal is provided on line 430 to control a 402 to indicate that a new end point has been found. When both VG7 and VG8 have found new start and end points for the intensity values, controller 402 can direct VG9, via line 432, to load in these new start and end values. In practice, because the operation of VG3, VG6 and VG9 are tied to the identification of new start and end values, which in turn are tied to the indication that a new Y value is to be generated, controller 402 can wait until VG1, VG2, VG4, VG5, VG7 and VG8 have all indicated that they have found new staring or ending points. Thereafter, controller 402 can issue a load command on lines 408 and 432 to load in these new start values to VG3, VG6 and VG9. As with VG6, VG9 generates a new intensity value for each new value of X generated by VG3. Thus VG9 receives a Next-VG9-x signal from controller 402 which indicates that the next X value is being generated. The Next-VG9-x and the Next-VG6-x signals need not originate from controller 402. Instead, the signals can come directly from the increment/decrement x output line from VG3. In such manner controller 402 has less control over the operation of VG6 and VG9, but the operation of VG6 and VG9 can be speeded up.

Thus, it can be seen that the pairs of vector generators VG1-VG2, VG4-VG5, and VG7-VG8 generate start and end values for X, Z and I, respectively, all tied to the Y coordinate value. Further, it can be seen that vector generators VG3, VG6 and VG9 generate intermediate X coordinate, Z coordinate, and intensity values, all referenced to the X coordinates being generated, and/or a pixel clock.

Controller 402 is shown coupled to system bus 400 so that it can receive information about the length of the line segments being evaluated by vector generators VG1, VG2, VG4, VG5, VG7 and VG8. As such, controller 402 can determine when a new set of line segments can be generated. When this is the case, controller 402 issues a next set command on line 434 to each of VG1, VG2, VG4, VG5, VG7, and VG8.

After each set of line segments defining a particular surface are evaluated, the next surface of the solid is evaluated as before. After all surfaces have been evaluated, refresh memory 14 will contain the intensity values for all visible surfaces in a bit met format. Because VG1, VG2, VG4, VG5, VG7 and VG8 can run in unison, and because VG3, VG6 and VG9 can also run in unison, the tasks involved in solids modeling can be performed in a very short amount of time as compared to previous apparatus.

Referring to FIG. 10, a generalized flow diagram of the solids modeling process is provided. As indicated earlier herein, the system processor is assumed to perform a presort of the surfaces of the solid to be generated in order to break the surfaces down into triangles or trapezoids having sides parallel to the selected axis. It is also assumed that the system processor will determine the intensity values at each of the vertices of the surfaces in the solid. All of these operations occur in step 436, FIG. 10.

In step 438, the start and end values for the line segments of the surfaces are provided to VG1, VG2, VG4, VG5, VG7 and VG8, and these vector generators are ordered to begin their run in step 440. In step 442, the controller 402 waits for an indication that VG1, VG2, VG4, VG5, VG7 and VG8 are done. If such is the case, controller 402 starts VG3, VG6 and VG9 in step 444. In step 446, it is determined whether VG3 has generated its next X value. If not, the system waits until such a value is generated. When the next x value is generated, step 448 is executed to cause VG6 and VG9 to generate their next Z and I values, respectively. When VG6 and VG9 are done, step 450 is entered to determine whether VG3 has completed its X coordinate generation for the current parallel line segment. If not, step 452 is executed in which VG3 is permitted to continue to generate the next x value. This is followed by a repeat of steps 446, 448 and 450. If in step 450 VG3 has completed its generation of the X coordinate values, step 454 is entered in which it is determined whether or not VG1, VG2, VG4, VG5, VG7 and VG8 have completed evaluating their line segments. If not, step 442 is entered and the coordinate generating process is continued. If in step 454 it is determined that the current line segments have been evaluated, step 456 is executed to retrieve the next set of line segments for evaluation. The system then returns to step 438.

Referring to FIGS. 11b-1 through 11b-4, a partial sample run for line segments AB, DC, EF and HG are shown. The information processed in VG1 is indicated by bracket 458, the information generated by VG2 is indicated by bracket 460. Bracket 461 indicates the $x_s$ and $x_e$ values correlated with the Y coordinate value which results from the information supplied to VG3 from VG1 and VG2. The information generated by VG4 is indicated by bracket 462, the information generated by VG5 is indicated by bracket 464. Bracket 465 indicates the corresponding $Z_s$ and $Z_e$ values, correlated with the Y coordinate value, which result from the information supplied to VG6 from VG4 and VG5. The information generated by VG6 for the first three parallel line segments for the surface are indicated by brackets 466, 468 and 470, respectively.

While example calculations for the intensity values have not been explicitly shown, it is to be understood that such evaluation is similar to that performed to obtain the Z values by VG6.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

I claim:

1. A graphics display apparatus for generating visual images of visible surfaces of geometric solids, wherein said geometric solids are defined by line segments which meet at vertices, and further wherein said vertices are defined in at least a three-dimensional coordinate system and by an intensity coordinate, comprising visual display means for displaying an array of pixels;

refresh memory means coupled to the visual display means for storing the array of pixels, wherein each pixel of the array of pixels is stored at a designated address;

a first plurality of vector generator means, coupled to address the refresh memory means and responsive to a first set of coordinate values from selected ones of said vertices which define line segments of the geometric solids that oppose one another, for determining start, end, and intermediate points of parallel line segments which extend between the opposing line segments and which are parallel to a first dimensional axis of the three-dimensional coordinate system, wherein the first set of coordinate values correspond to a first set of specified coordinate dimensions of the three-dimensional coordinate system, and the start, end, and intermediate points are expressed in the first set of specified coordinate dimensions;

a second plurality of vector generator means, responsive to a second set of coordinate values from said selected ones of said vertices and to the start, end, and intermediate points of the parallel line segments, for determining coordinates values of the start, end, and intermediate points of said parallel line segments for the dimensional coordinates of the multi-dimensional coordinate system which were not included in the first set of dimensional coordinates, wherein the second set of coordinate values include coordinates which correspond to a second set of coordinate dimensions of the three-dimensional coordinate system, at least one coordinate dimension of which is different from that in the first set of specified coordinate dimensions;

means coupled to the first and second plurality of vector generator means, to the refresh memory means, and to the control means, for enabling the refresh memory means when points on visible surfaces are being identified by the first and second vector generator means;

a third plurality of vector generator means, coupled to the refresh memory means and to the determining means and responsive to the intensity and dimensional coordinate values from the selected ones of said vertices, for determining start, end, and intermediate intensity values of the parallel line segments and for supplying said intensity values to the refresh memory means; and control means for coordinating the operation of the first, second, and third plurality of vector generator means and for addressing the refresh memory means and the determining means so that intensity values of the visible surface of the geometric solid are stored at the appropriate designated address of the refresh memory means.

2. The apparatus of claim 1, wherein the vector generator means in the pluralities of vector generator means are Bresenhem vector generators.

3. The apparatus of claim 1, wherein each of the first, second and third pluralities of vector generators comprise first vector generator means responsive to the end points for one of the opposing line segments for determining intermediate points along the one opposing line segment;

second vector generator means responsive to the end points for a different one of the opposing line segments for determining intermediate points along the different one opposing line segment; and third vector generator means responsive to the intermediate points determined by the first and second vector generator means for determining the intermediate points of the parallel line segments.

4. The apparatus of claim 3, wherein the first and second vector generator means of each of the first, second, and third pluralities of vector generator means, generate a new-start-found signal or a new-end-found whenever a start or an end point, respectively, whenever a new parallel line segment is identified, and further wherein the third vector generator means of each of the first, second, and third pluralities of vector generator means is responsive to a next-point signal and generates a next intermediate point of the new parallel line segment, the control means comprising means coupled to each of the first, second, and third pluralities of vector generator means and responsive to the new-start-found signals for inhibiting the operation of the third vector generator means of each of the first, second, and third pluralities of vector generator means until the new-start-found or new-end-found signal is received from all of the first and second vector generator means of the first, second and third pluralities of vector generator means, and for thereafter issuing a next-point signal to the third vector generator means of each of the first, second, and third pluralities of vector generator means until the intermediate points are produced for the new parallel line segment.

5. The apparatus of claim 4, wherein the third vector generator means of each of the first, second, and third pluralities of vector control means respond to a load signal by accepting the start and end points of a next parallel line to be defined, and further wherein the control means includes means responsive to the next-point signals for determining when each of the third vector generator means of each of the first, second and third pluralities of vector generator means has completed generating the intermediate points of the parallel line segment being defined and for thereafter supplying a load signal to the third vector generator means of each of the first, second, and third pluralities of vector generator means; and means for determining when all parallel line segments for the selected ones of said vertices have been defined for controlling the first and second vector generators of each of the first, second, and third pluralities of vector generators to process a next set of selected ones of said vertices.

6. The apparatus of claim 5, wherein the determining means includes memory means addressed by the control means and the third vector generator means of the first plurality of vector generator means for storing depth information from the third vector generator means from the second plurality of vector generator means at the locations being addressed whenever the enable signal is generated, and for reading out depth information from the locations being addressed in the absence of the enable signal; and comparison means responsive to the depth information read out from the memory means for comparing the depth information against depth information currently being supplied by the third vector generator means of the second plurality of vector generator means and for providing the enable signal whenever the depth information currently being supplied by the third vector generator means exceeds the depth information from the memory means.

7. The apparatus of claim 6, wherein the control means further includes counter means, responsive to a start address and to the load signal for addressing the refresh memory means and the determining means, wherein the output of the counter means supplies a coordinate value which is common to points of the parallel line segment being defined by the first and second pluralities of vector generator means.

8. The apparatus of claim 1, wherein the vector generator means in the pluralities of vector generator means are differential drawing analyzers.

* * * * *